US012510842B2

(12) United States Patent
Saito

(10) Patent No.: US 12,510,842 B2
(45) Date of Patent: Dec. 30, 2025

(54) IMAGE FORMING APPARATUS

(71) Applicant: CANON KABUSHIKI KAISHA, Tokyo (JP)

(72) Inventor: Tomohiro Saito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/816,755

(22) Filed: Aug. 27, 2024

(65) Prior Publication Data

US 2025/0076782 A1 Mar. 6, 2025

(30) Foreign Application Priority Data

Aug. 28, 2023 (JP) ................................ 2023-138478

(51) Int. Cl.
*G03G 15/16* (2006.01)
*G03G 15/01* (2006.01)
*G03G 15/06* (2006.01)

(52) U.S. Cl.
CPC ....... *G03G 15/065* (2013.01); *G03G 15/0194* (2013.01)

(58) Field of Classification Search
CPC ......................... G03G 15/065; G03G 15/0194
USPC ...................................................... 399/38, 66
See application file for complete search history.

(56) References Cited

U.S. PATENT DOCUMENTS 10,585,376 B2 * 3/2020 Murayama ......... G03G 15/5062
11,029,626 B2 * 6/2021 Torimaru ............... G03G 15/55

FOREIGN PATENT DOCUMENTS

JP 2005-173002 A 6/2005
JP 2019-020658 A 2/2019
JP 2019-082554 A 5/2019
JP 2020-027144 A 2/2020

* cited by examiner

*Primary Examiner* — Hoan H Tran
(74) *Attorney, Agent, or Firm* — Venable LLP

(57) ABSTRACT

An image forming apparatus includes an image bearing member, a transfer member, an applying portion, a detecting portion, and a controller. In a case where an adjusting operation is executed from reception of a start signal of image formation to a start of transfer of an image on a first sheet in the transfer portion, the controller controls the applying portion so that a second test bias is higher in absolute value of a voltage than a first test bias and controls the applying portion so that a time in which the first test bias is applied to the transfer portion is set to a first time and so that a time in which the second test bias is applied to the transfer portion is set to a second time longer than the first time.

11 Claims, 11 Drawing Sheets

IMAGE FORMING APPARATUS

FIELD OF THE INVENTION AND RELATED ART

The present invention relates to an image forming apparatus, such as a copying machine, a printer, a facsimile machine, a printing device, or a multi-function machine having a plurality of functions of these machines, of an electrophotographic type or an electrostatic recording type.

In the image forming apparatus of the electrophotographic type or the like, an image is formed and outputted by an image forming process including a step in which a toner image formed on an image bearing member is transferred onto a toner image receiving member. For example, in the image forming apparatus, a transfer bias is applied to a transfer member when a recording material as the toner image receiving member passes through a transfer portion formed in a contact portion between the image bearing member and the transfer member, so that the toner image is transferred from the image bearing member onto the recording material by the action of an electric field formed in the transfer portion. As the transfer member, a transfer roller constituted by a rotatable roller has been used widely.

The transfer roller is constituted so as to have an electric resistance value of, for example, about $1\times10^6$ to $1\times10^{10}\Omega$. The transfer roller is constituted by providing an elastic layer about an electroconductive core metal. The transfer roller is roughly classified into two types consisting of a transfer roller of an electron-conduction type and a transfer roller of an ion-conduction type depending on a manner of imparting electroconductivity to the elastic layer. As the transfer roller of the electron-conduction type, it is possible to cite, as an example, a roller constituted by dispersing an electroconductive filler, such as carbon black or metal oxide, as an electron-conductive agent in the elastic layer formed with EPDM (ethylene-propylene-diene rubber), a urethane rubber, or the like. Further, as the transfer roller of the ion-conduction type, it is possible to cite, as an example, a roller in which a material itself of the elastic layer formed with the urethane rubber or the like possesses an ion-conductive property and a roller constituted by dispersing, as the ion-conductive agent, a surfactant or the like in the elastic layer.

Transfer bias control includes constant-current control and constant-voltage control. In order to obtain a good transfer property, it is ideal that a charge amount of electric charges supplied to the transfer portion is controlled to a predetermined charge amount. As one of methods therefor, it would be considered that the transfer bias is subjected to the constant-current control. However, between a recording material presence portion and a recording material absence portion in the transfer portion, load impedances of the transfer roller on a photosensitive drum are different from each other, so that at the recording material absence portion, the load impedance becomes small. For that reason, depending on a size of the recording material used, there is a possibility that a current in a large amount flows through the recording material absence portion concentratedly, so that improper transfer occurs at the recording material presence portion. On the other hand, in the case where the transfer bias is subjected to the constant-voltage control, the charge amounts of the electric charges supplied from the transfer roller to the transfer portion are always almost the same. For that reason, the transfer bias is subjected to the constant-voltage control in many cases.

Here, it is known that an electric resistance value of the transfer roller of, particularly, the ion-conductive type is liable to fluctuate by a temperature and a humidity of an ambient environment. When a desired transfer current cannot be obtained due to the fluctuation or the like of the electric resistance value of the transfer roller, there is a possibility that the improper transfer or the like occurs.

Therefore, the following ATVC (Active Transfer Voltage Control) for setting the transfer bias depending on the electric resistance value of the transfer portion (principally the transfer roller) is proposed (Japanese Laid-Open Patent Application No. 2020-27144). That is, for example, in a preparatory operation (pre-rotation step, pre-multi-rotation step) before image formation, test biases (test currents or test voltages) of a plurality of levels are applied to the transfer roller, and a voltage-current characteristic (VI characteristic) as information on the electric resistance value of the transfer portion (principally the transfer roller) is acquired. Then, on the basis of the voltage-current characteristic, a transfer voltage at the constant-voltage control of the transfer bias applied to the transfer roller is determined so that a desired transfer current flows during the image formation (during transfer).

Incidentally, the transfer roller causes unevenness of the electric resistance value in a circumferential direction (rotational direction) in some instances (hereinafter, this unevenness is referred to as "circumferential unevenness"). This circumferential unevenness not only leads to non-uniformity of a material for adjusting the electric resistance value of the transfer roller but also becomes conspicuous by being partially influenced by a change in temperature or humidity in some instances. Specifically, a difference in electric resistance value due to heat from the fixing device between a position of the transfer roller opposing the fixing device and a position opposite thereto is noted.

For that reason, in conventional ATVC, test biases of a plurality of levels are applied to the transfer roller over a time corresponding to substantially one full circumference or revolution of the transfer roller. Further, an average (value) of currents or voltages detected when the test biases of the plurality of levels are applied to the transfer roller is used, so that a voltage-current characteristic is acquired.

However, in the above-described conventional ATVC, depending on the number of the levels of the test biases, a time for acquiring the voltage-current characteristic is needed. For example, in the case where the test biases of three levels are used, a time corresponding to three circumferences or revolutions is needed. For that reason, due to a time for the ATVC, a downtime (a period in which the image cannot be outputted) becomes long in some instances.

In recent years, in the multi-function machine or the like, there is a tendency that further shortening of FCOT (First Copy Output Time) is required. For that reason, it is required to shorten the time required for the ATVC. However, an improvement in image quality of the image forming apparatus also advances, and it is required to shorten a control time while sufficiently maintaining accuracy of control of the test bias.

SUMMARY OF THE INVENTION

A principal object of the present invention is to enable shortening of a control time while sufficiently maintaining accuracy of control of a test bias.

This object is accomplished by an image forming apparatus according to the present invention.

According to an aspect of the present invention, there is provided an image forming apparatus comprising: an image bearing member configured to bear a toner image; a transfer member configured to form a transfer portion where the toner image is transferred from the image bearing member onto a toner image receiving member; an applying portion configured to apply a bias to the transfer portion; a detecting portion configured to detect a voltage applied to the transfer portion or a current flowing through the transfer portion when the bias is applied to the transfer portion by the applying portion; and a controller capable of controlling the applying portion so as to execute an adjusting operation in which a transfer bias applied to the transfer portion by the applying portion during transfer is set on the basis of a detection result of the detecting portion when a plurality of test biases including a first test bias and a second bias are applied to the transfer portion by the applying portion during non-image formation, wherein in a case where the adjusting operation is executed from reception of a start signal of image formation to a start of transfer of an image on a first sheet in the transfer portion, the controller is configured to control the applying portion so that the second test bias is higher in absolute value of a voltage than the first test bias and is configured to control the applying portion so that a time in which the first test bias is applied to the transfer portion is set to a first time and so that a time in which the second test bias is applied to the transfer portion is set to a second time longer than the first time.

Further features of the present invention will become apparent from the following description of exemplary embodiments with reference to the attached drawings.

Figure 5:
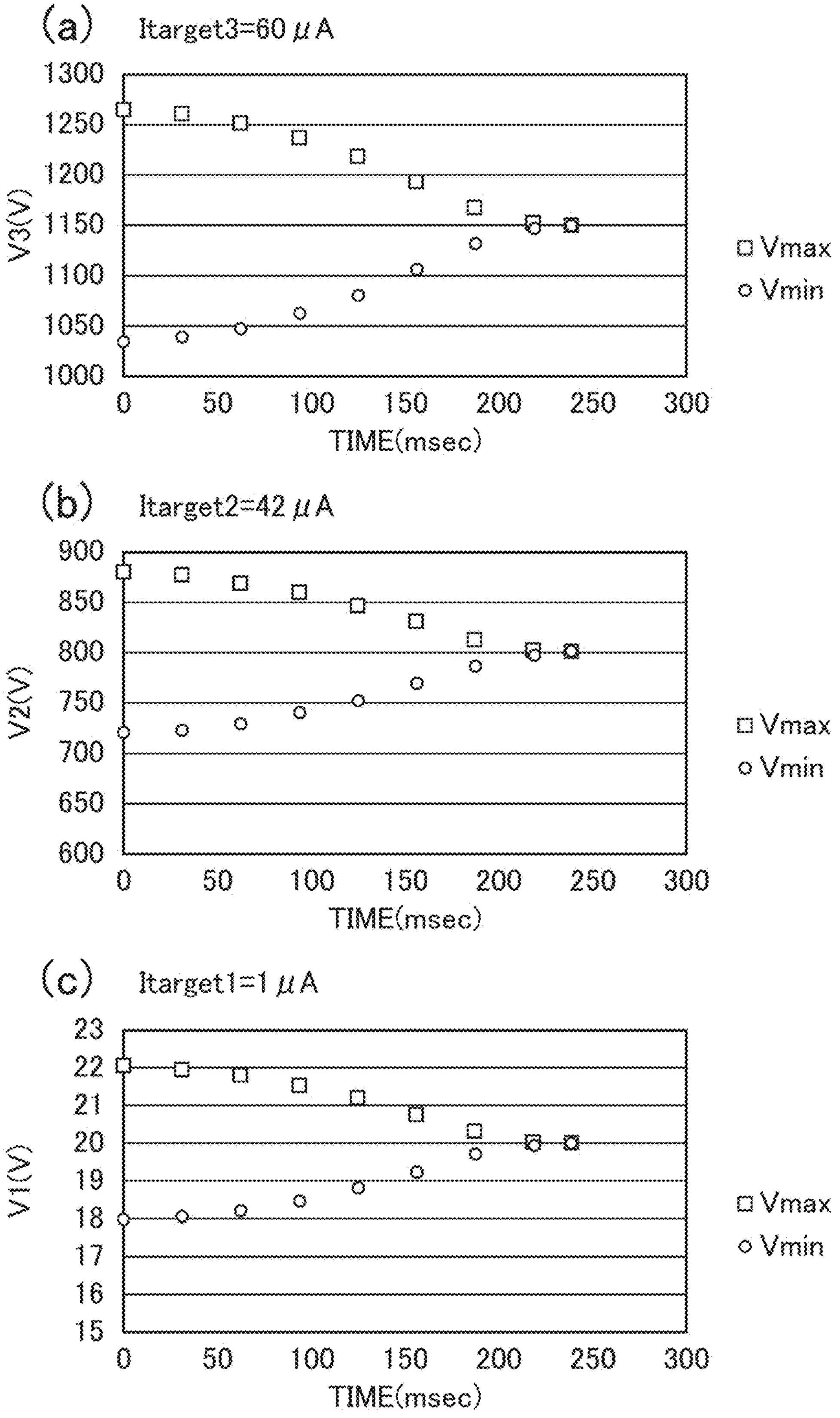

Parts (a), (b) and (c) of FIG. 5 are graphs for illustrating an effect of the embodiment 1.

Figure 6:
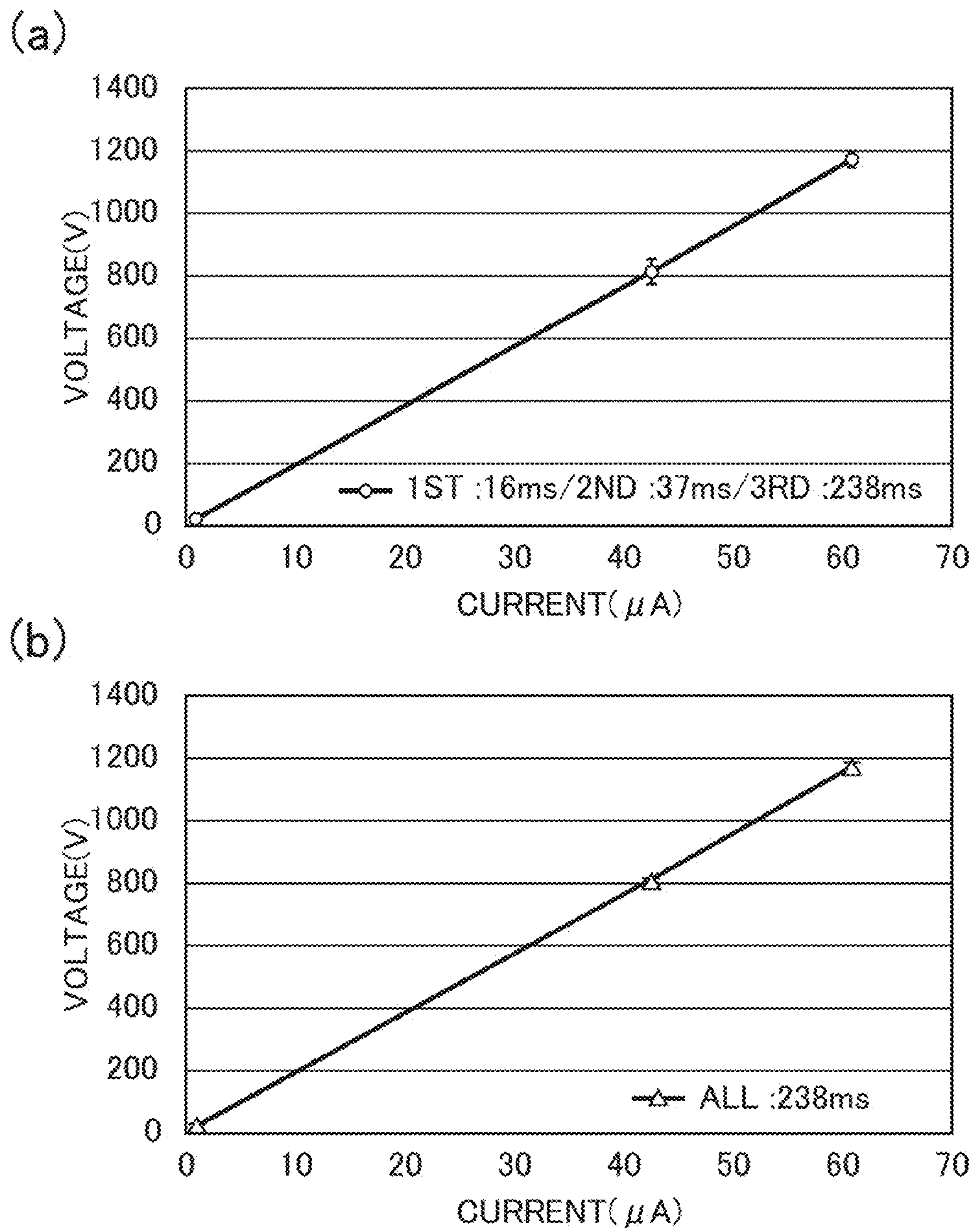

Parts (a) and (b) of FIG. 6 are graphs for illustrating an effect of the embodiment 1.

Figure 7:
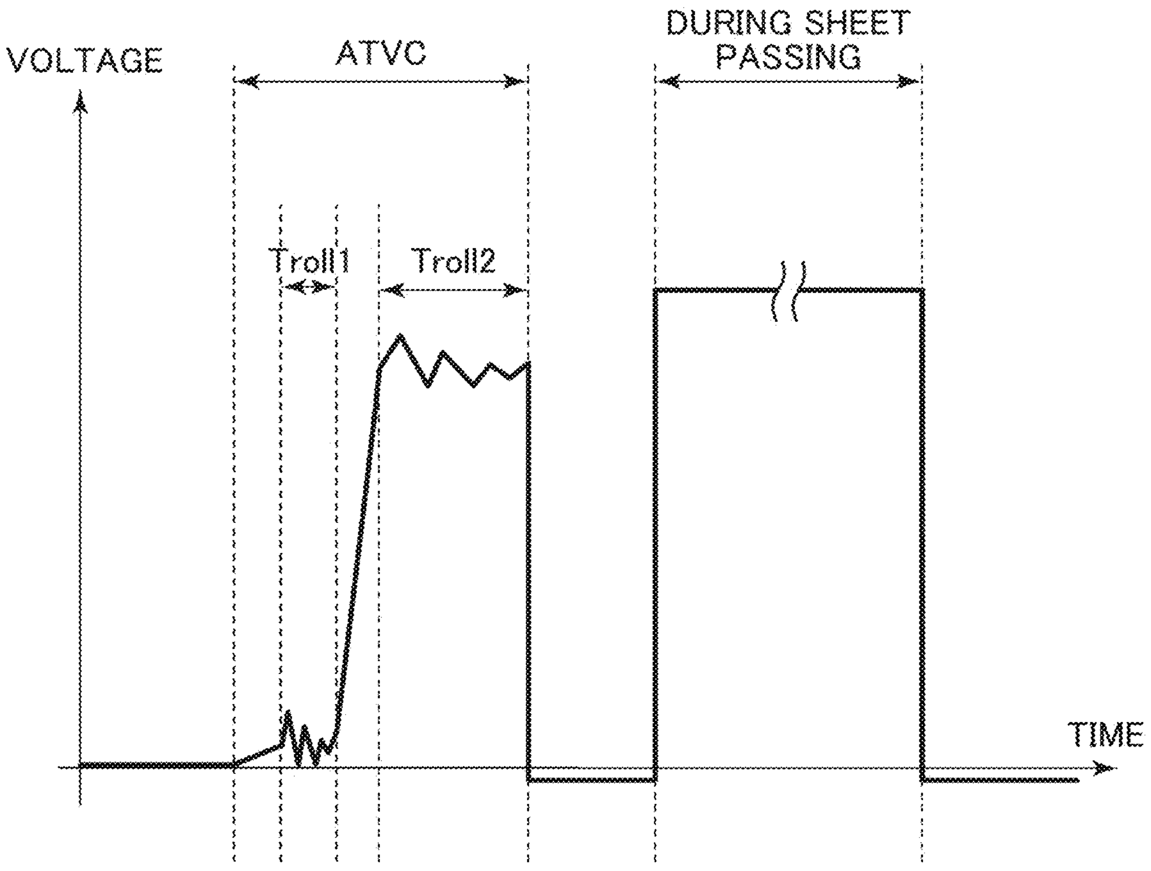

FIG. 7 is a graph showing progression of an applied voltage to a test bias portion in control of an embodiment 2.

Figure 8:
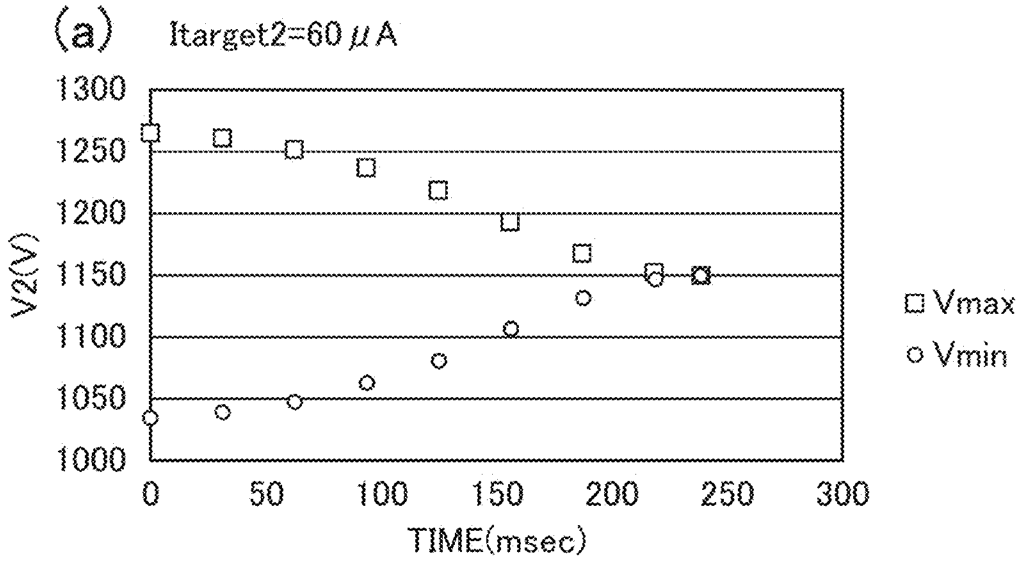
Figure 8:
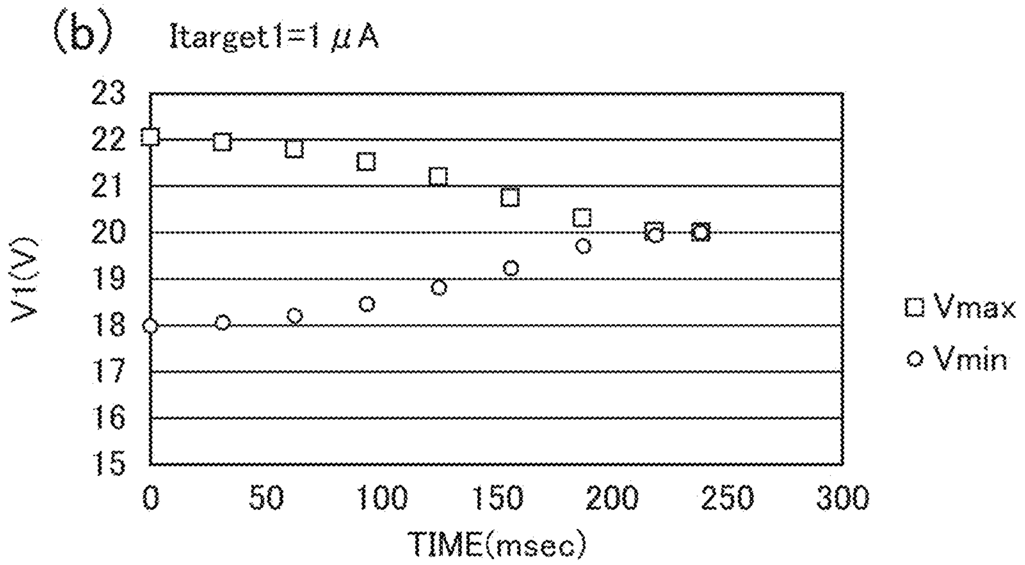

Parts (a) and (b) of FIG. 8 are graphs for illustrating an effect of the embodiment 2.

Figure 9:
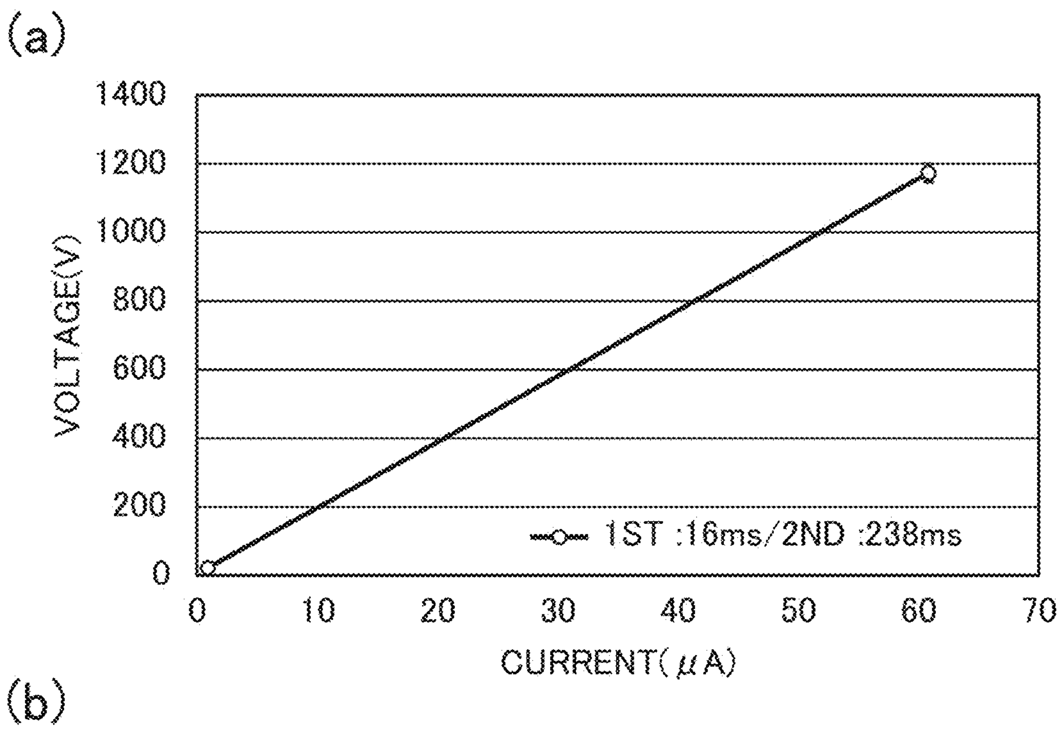

Parts (a) and (b) of FIG. 9 are graphs for illustrating an effect of the embodiment 2.

Figure 10:
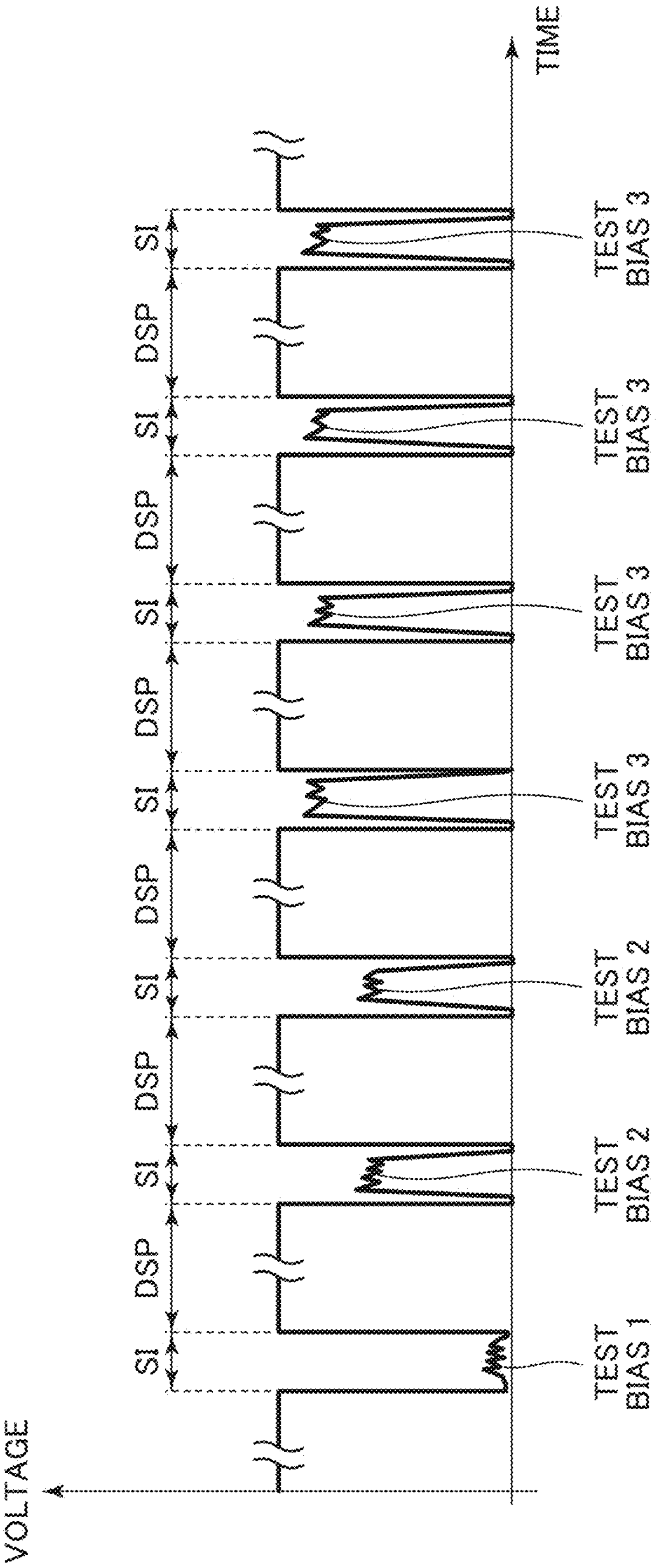

FIG. 10 is a graph showing progression of an applied voltage to a transfer portion in control of an embodiment 3.

Figure 11:
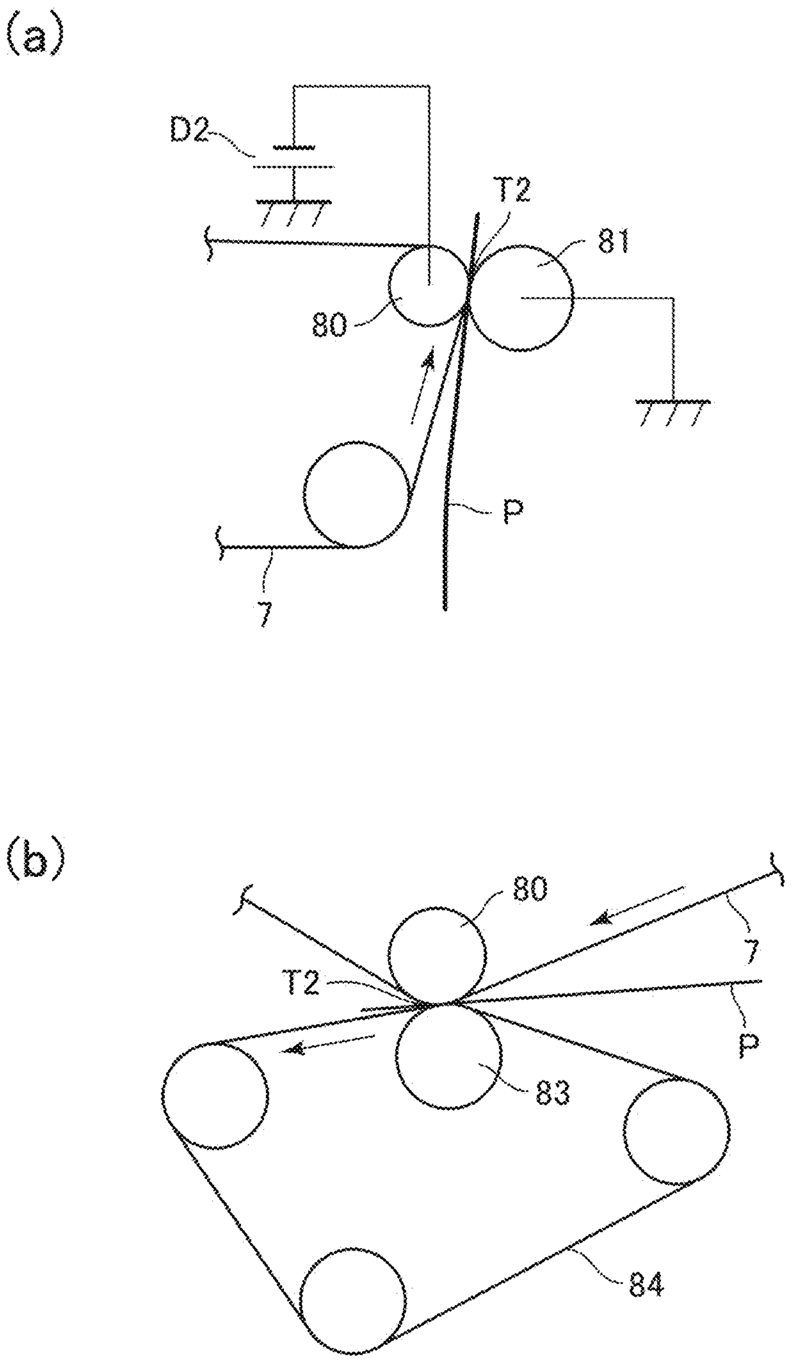

Parts (a) and (b) of FIG. 11 are schematic views each showing another example of a constitution of a secondary transfer portion.

DESCRIPTION OF EMBODIMENTS

An image forming apparatus according to the present invention will be specifically described with reference to the drawings.

Embodiment 1

1. General Constitution and Operation of Image Forming Apparatus

Figure 1:
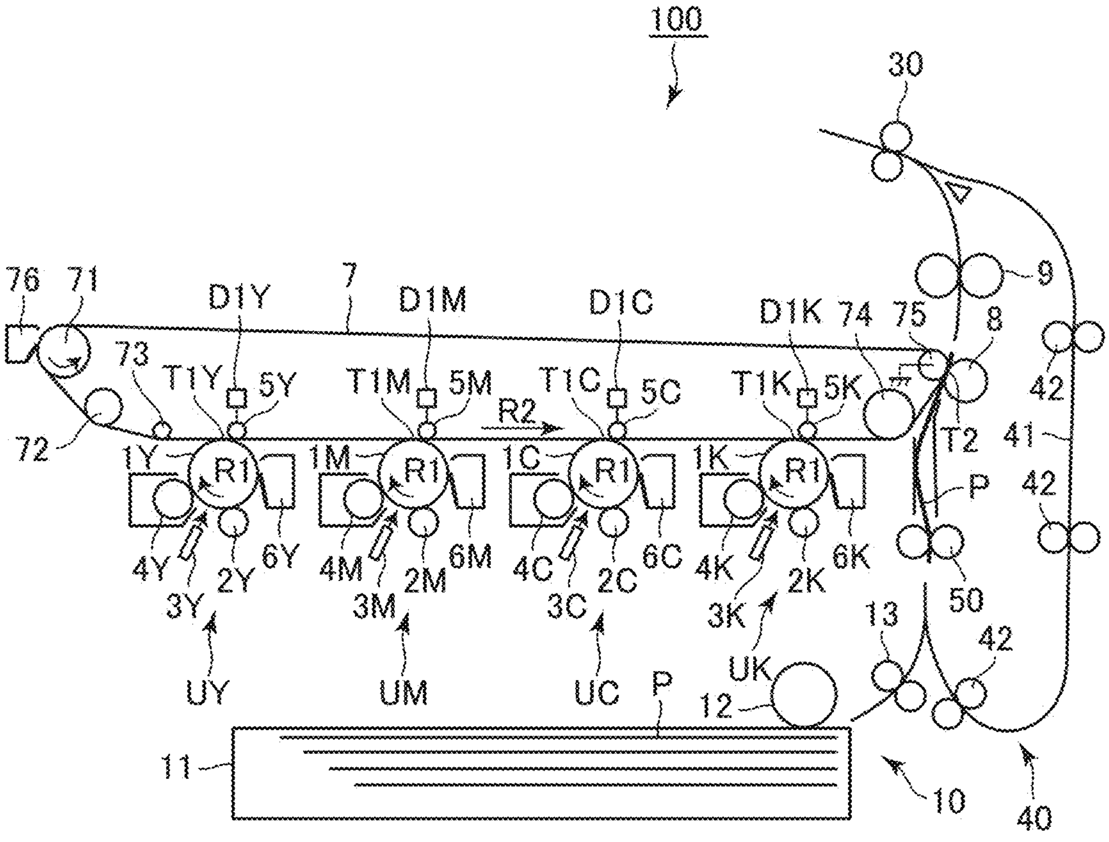
FIG. 1 is a schematic sectional view of an image forming apparatus.

FIG. 1 is a schematic sectional view of an image forming apparatus 100 of an embodiment 1. The image forming apparatus 100 in this embodiment is a tandem printer which is capable of forming a full-color image on a sheet-like recording material P using an electrophotographic type method and which employs an intermediary transfer type system.

The image forming apparatus 100 includes, as a plurality of image forming portions, four image forming units UY, UM, UC, and UK for forming images of yellow (Y), magenta (M), cyan (C) and black (K). As regards elements provided for respective colors, and having the same or corresponding functions or constitutions, suffixes Y, M, C and K for representing the elements for associated colors are omitted, and the elements will be collectively described in some instances. In this embodiment, the image forming unit U is constituted by including a photosensitive drum 1, a charging roller 2, an exposure device 3, a developing device 4, a primary transfer roller 5, a drum cleaning device 6 and the like, which are described later.

The photosensitive drum 1 which is a rotatable drum-shaped photosensitive member (electrophotographic photosensitive member) as a first image bearing member for bearing a toner image is rotationally driven at a predetermined peripheral speed in an arrow R1 direction (clockwise direction) by a driving force transmitted from a driving motor (not shown) as a driving means. A surface of the rotating photosensitive drum is electrically charged uniformly to a predetermined polarity (negative in this embodiment) and a predetermined potential by the charging roller 2 which is a roller-type charging member as a charging means. The charging roller 2 is disposed in contact with the surface of the photosensitive drum 1 and is rotated with rotation of the photosensitive drum 1. The charged surface of the photosensitive drum 1 is subjected to scanning exposure to light depending on image data (image information signal) by the exposure device (laser scanner) 3 as an exposure means, so that an electrostatic image (electrostatic latent image) depending on the image data is formed on the photosensitive drum 1. The exposure device 3 may be constituted as a single unit capable of exposing, for example, four photosensitive drums 1 to light.

Incidentally, for convenience, a voltage (potential) and a magnitude (high/low) of a current refer to a magnitude (high/low) in the case where these values are compared with each other in terms of an absolute value unless otherwise specified.

The electrostatic image formed on the photosensitive drum 1 is developed (visualized) by being supplied with toner as a developer by the developing device 4 as a developing means, so that a toner image (toner picture, developer image) depending on the image data is formed on the photosensitive drum 1. In this embodiment, the toner charged to the same polarity as a charge polarity of the photosensitive drum 1 is deposited on an exposed portion (image portion) of the photosensitive drum 1 where the potential is lowered by exposing to light the surface of the photosensitive drum 1 after the photosensitive drum 1 is uniformly charged (reverse development type). In this embodiment, a normal charge polarity of toner which is a principal charge polarity of the toner during development is a negative polarity.

As a second image bearing member for bearing the toner image, an intermediary transfer belt 7 which is a rotatable intermediary transfer member, having an endless belt shape is provided so as to oppose the four photosensitive drums 1. The intermediary transfer belt 7 is extended around and stretched at a predetermined tension by a plurality of stretching rollers (supporting rollers) including a driving roller 71, a tension roller 72, idler rollers 73 and 74 and a secondary transfer opposite roller 75. The intermediary transfer belt 7 is constituted by an endless belt (film) formed of a material including a resin material, such as polyimide or polyamide, or various rubbers and including an electroconductive filler such as carbon black, an ion conductive material or the like, which are contained and dispersed in the resin material or in the various rubbers, for example. The intermediary transfer belt 7 is $1\times10^{9}$-$5\times10^{11}$ Ω/square in surface resistivity and is about 0.04-0.05 mm in thickness, for example.

The driving roller 71 is rotationally driven by a driving force transmitted from a motor (unshown) as a driving means, so that the intermediary transfer belt 7 is rotated (circulatory movement, circumferential movement) at a peripheral speed corresponding to the peripheral speed of the photosensitive drum 1 in an arrow R2 direction (counterclockwise direction). The tension roller 72 imparts a certain tension to the intermediary transfer belt 7. The idler rollers 73 and 74 support the surface of the intermediary transfer belt 7 extending along an arrangement direction of the four photosensitive drums 1Y, 1M, 1C and 1K. The secondary transfer opposite roller 75 functions as an opposing member (opposing electrode) of a secondary transfer roller 8 (described later). Incidentally, the tension of the intermediary transfer belt 7 to the tension roller 72 is about 3-12 kgf. On the inner peripheral surface side of the intermediary transfer belt 7, the primary transfer rollers 5Y, 5M, 5C, and 5K, which are roller-type primary transfer members as primary transfer means, are disposed correspondingly to the respective photosensitive drums 1. In this embodiment, the primary transfer roller 5 is constituted by a metal roller. The primary transfer roller 5 presses the intermediary transfer belt 7 toward an associated photosensitive drum 1, whereby a primary transfer portion (primary transfer nip) T1 where the photosensitive drum 1 and the intermediary transfer belt 7 contact each other is formed. The stretching rollers other than the driving roller 71 and the respective primary transfer rollers 5 are rotated with rotation of the intermediary transfer belt 7.

The toner image formed on the photosensitive drum 1 as described above is primary-transferred onto the rotating intermediary transfer belt 7 as a toner image receiving member in the primary transfer portion T1 by the action of the primary transfer roller 5. During the primary transfer, to the primary transfer roller 5, a primary transfer bias (primary transfer voltage) which is a DC voltage of an opposite polarity (positive in this embodiment) to the normal charge polarity of the toner is applied by a primary transfer power source (high voltage power source circuit) D1 as a primary transfer voltage applying portion. For example, during full-color image formation, the color toner images of Y, M, C and K formed on the respective photosensitive drums 1 are successively primary-transferred superposedly onto the intermediary transfer belt 7 in the respective primary transfer portions T1.

On an outer peripheral surface side of the intermediary transfer belt 7, at a position opposing the secondary transfer opposite roller 75, the secondary transfer roller 8 which is a roller-type secondary transfer member as a secondary transfer means is provided. The secondary transfer roller 8 is urged toward the secondary transfer opposite roller 75 through the intermediary transfer belt 7 and forms a secondary transfer portion (secondary transfer nip) T2 where the intermediary transfer belt 7 and the secondary transfer roller 8 contact each other. The secondary transfer roller 8 is rotationally driven by a driving force transmitted from a driving motor (not shown) as a driving means in this embodiment, but may have a constitution in which the secondary transfer roller 8 is rotated with the rotation of the intermediary transfer belt 7. The toner images formed on the intermediary transfer belt 7 as described above are transferred (secondary-transferred) in the secondary transfer portion T2 onto a recording material P as a toner image receiving member nipped and conveyed by the intermediary transfer belt 7 and the secondary transfer roller 8 at the secondary transfer portion T2 by the action of the secondary transfer roller 8. During the secondary transfer, to the secondary transfer roller 8, a secondary transfer bias (secondary transfer voltage) which is a DC voltage of the opposite polarity to the normal charge polarity of the toner is applied by a secondary transfer power source (high voltage source power circuit) D2 (FIG. 2) as a transfer voltage applying portion.

The recording material (transfer material, recording medium, sheet) P such as paper is supplied toward the secondary transfer portion T2 by a recording material supplying device 10 as a recording material supplying portion. The recording material supplying device 10 includes a recording material accommodating portion (cassette, tray or the like) 11 for accommodating the recording material P, a pick-up roller 12 for feeding the recording material P one by one from the recording material accommodating portion 11 at predetermined timing, a conveying roller pair 13 for conveying the fed recording material P, and the like. The recording material P conveyed by the conveying roller pair 13 is conveyed toward the secondary transfer portion T2 by being timed to the toner images on the intermediary transfer belt 7 by a registration roller pair 50 as a registration correcting portion. The recording material P on which the toner images are transferred is conveyed toward a fixing device 9 as a fixing means. The fixing device 9 heats and presses the recording material P carrying thereon unfixed toner images, and thus fixes (melts, sticks) the toner images on the recording material P.

In the case where an image forming mode is a one-side mode (one-side printing) in which the image is formed on only one side (surface) of the recording material P, the recording material P on which the toner images are fixed on one side (surface) thereof by the fixing device 9 is discharged (outputted) to an outside of an apparatus main assembly of the image forming apparatus 100 by a discharging roller pair 30 as a discharging portion. On the other hand, in the case where the image forming mode is a double-side mode (automatic double-side printing) in which the images are formed on double (both) sides (surfaces) of the recording material P, the recording material P on which the image is formed (the toner image is fixed) on a first side (surface) by the fixing device 9 is conveyed again to the secondary transfer portion T2 by a double-side conveying device 40. In the case of the double-side mode, the discharging roller pair 30 is reversed at a predetermined timing before the recording material P on which the image is formed on the first side is discharged to the outside of the image forming apparatus. By this, the recording material P is guided into a reverse path (double-side conveying path) 41 of the double-side conveying device 40. The recording material P guided into the reverse path 41 is conveyed toward the registration roller pair 50 by a pre-conveying roller pair 42. Similarly as in the case of the image formation on the first side, this recording material P is conveyed to the secondary transfer portion T2 by being timed to the toner images on the intermediary transfer belt 7 by the registration roller pair 50, so that the toner images are secondary transferred onto a second side (surface) opposite from the first side. The recording material P on which the toner images are transferred on the second side is discharged by the discharging roller pair 30 to the outside of the image forming apparatus after the toner images are fixed on the second side of the recording material P by the fixing device 9.

Further, toner (primary transfer residual toner) remaining on the photosensitive drum 1 without being transferred onto the intermediary transfer belt 7 during the primary transfer is removed and collected from the photosensitive drum 1 by a drum cleaning device 6 as a photosensitive member cleaning means. Further, on the outer peripheral surface side of the intermediary transfer belt 7, at a position opposing the driving roller 71, a belt cleaning device 76 as an intermediary transfer member cleaning means is provided. Deposited matters such as toner (secondary transfer residual toner) remaining on the intermediary transfer belt 7 without being transferred onto the recording material P during the secondary transfer, and paper powder are removed and collected from the surface of the intermediary transfer belt 7 by the belt cleaning device 76.

2. Secondary Transfer Constitution

Figure 2:
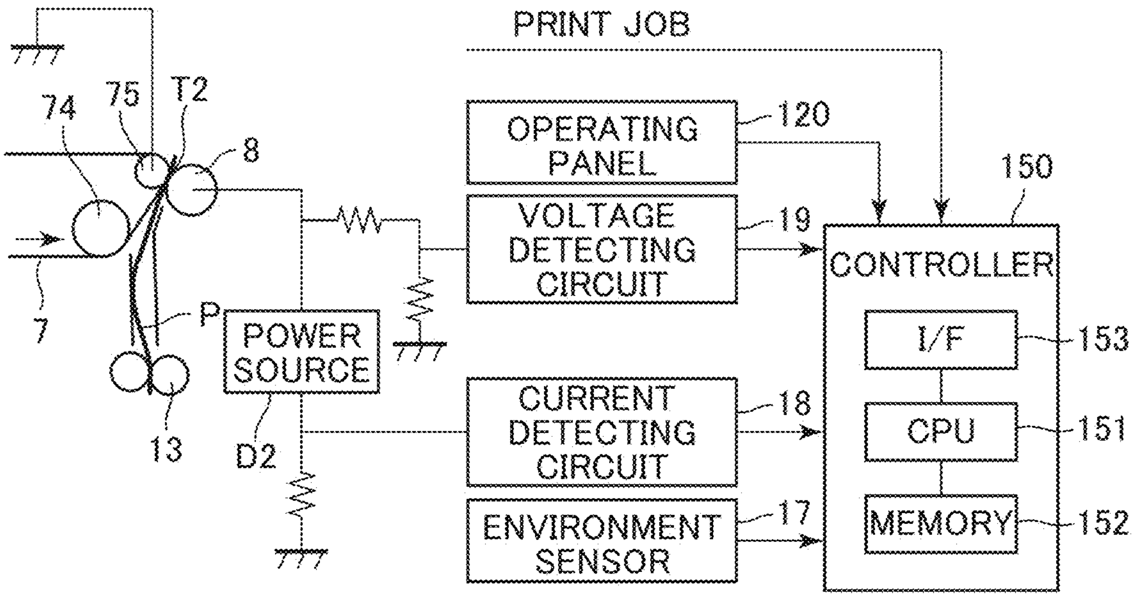
FIG. 2 is a schematic view for illustrating a structure of a secondary transfer portion.

FIG. 2 is a schematic view for illustrating a constitution of the secondary transfer portion T2 of the image forming apparatus 100 of this embodiment.

The secondary transfer roller 8 is press-contacted to the intermediary transfer belt 7 supported at an inner surface by the secondary transfer opposite roller 75 connected to a ground potential, so that the secondary transfer portion T2 is formed between the intermediary transfer belt 7 and the secondary transfer roller 8. A transfer electric field is formed at the secondary transfer portion T2 by applying a positive (−polarity) DC voltage as a secondary transfer bias (secondary transfer voltage) from the secondary transfer voltage source D2 to a core metal (rotation shaft) of the secondary transfer roller 8. By this, the toner images of the negative toner carried on the intermediary transfer belt 7 are transferred (secondary-transferred) onto the recording material P passing through the secondary transfer portion T2.

The secondary transfer opposite roller 75 is constituted by forming a 0.5 mm-thick electroconductive rubber layer as an elastic layer around a stainless roller of 15 mm in diameter as a core metal (base material). In this embodiment, an outer diameter of the secondary transfer opposite roller 75 is 16 mm. As a material of the electroconductive rubber, a rubber obtained by incorporating an ion-conductive agent in a nitrile-butadiene rubber, an ethylene-propylene-diene rubber, a urethane rubber or the like is used. In this embodiment, an electric resistance value of the secondary transfer opposite roller 75 is adjusted to $1\times10^{5}\Omega$ or less. Incidentally, this electric resistance value was acquired in the following manner. To the secondary transfer opposite roller 75, 10N is applied, so that the secondary transfer opposite roller 75 is press-contacted to an electroconductive cylinder. Then, a current flowing when a voltage of 50 V was applied to a rotation shaft (core metal) of the secondary transfer opposite roller 75 while rotating the secondary transfer opposite roller 75 by rotation of electroconductive cylinder is measured. On the basis of this current, the above-described electric resistance value was acquired. Further, in this embodiment, surface hardness of the secondary transfer opposite roller 75 is 70 degrees in terms of an ASKER-C hardness value.

The secondary transfer roller 8 is constituted by forming a 6 mm-thick electroconductive rubber sponge as an elastic layer around a stainless-steel rotation shaft of 12 mm in diameter as a core metal (base material). In this embodiment, an outer diameter of the secondary transfer roller 8 is 24 mm. As a material of the electroconductive rubber sponge, a rubber sponge which is obtained by incorporating an ion-conductive agent in a nitrile-butadiene rubber, an ethylene-propylene-diene rubber, a urethane rubber or the like and which is adjusted so as to have an electric resistance value of $1\times10^{7}$-$1\times10^{8}\Omega$ is used. Incidentally, this electric resistance was acquired in the following manner. To the secondary transfer roller 8, 10N is applied, so that the secondary transfer roller 8 is press-contacted to the electroconductive cylinder. Then, a current flowing when a voltage of 2 kV was applied to the rotation shaft (core metal) while rotating the secondary transfer roller 8 by rotation of the electroconductive cylinder is measured. On the basis of this current, the above-described electric resistance value was acquired. Further, in this embodiment, surface hardness of the secondary transfer roller 8 is 35 degrees in terms of the ASKER-C hardness value.

Here, the electroconductive sponge layer of the secondary transfer roller 8 causes unevenness of the electric resistance value in the circumferential direction (rotational direction) of the secondary transfer roller 8 in general ("circumferential unevenness"). In this embodiment, this circumferential unevenness is 1.1 in the case where the circumferential unevenness is represented by a difference between a common logarithm of a maximum and a common logarithm of a minimum of the electric resistance value in the circumferential direction of the secondary transfer roller 8 (i.e., =(common logarithm of maximum)−(common logarithm of minimum)).

In FIG. 2, a control constitution of a principal part of the image forming apparatus 100 in this embodiment is shown.

A controller (DC controller) 150 is constituted by including a CPU 151 as a control means which is a dominant element for performing processing, and memories (storing media) 152 such as a ROM and a RAM which are used as storing means. In the RAM, which is rewritable memory, information inputted to the controller 150, detected information, a calculation result and the like are stored. In the ROM, a data table acquired in advance and the like are stored. The CPU 151 and the memories 152 such as the ROM and the RAM are capable of transferring and reading the data therebetween. Further, the controller 150 is provided with a communicating portion (I/F) 153 for exchanging information with an external device (not shown) such as a personal computer. The CPU 151 is connected to the external device through the communicating portion 153 in a communicatable manner, and is capable of receiving data from the external device.

To the controller 150, the secondary transfer power source D2 is connected. The secondary transfer power source D2 is capable of applying a bias subjected to constant-voltage control with a predetermined target voltage and a bias subjected to constant-current control with a predetermined target current in a switching manner. The controller 150 controls the secondary transfer power source D2, and determines a secondary transfer bias to be applied to the secondary transfer roller 8 during a secondary transfer. Then, during the secondary transfer, the controller 150 causes the secondary transfer power source D2 to apply the secondary transfer bias to the secondary transfer roller 8.

In this embodiment, the controller 150 is capable of carrying out constant-voltage control of the bias applied from the secondary transfer power source D2 to the secondary transfer roller 8 by controlling a voltage outputted from the secondary transfer power source D2 so that a voltage value detected by a voltage detecting circuit 19 (described later) is a predetermined voltage value. Further, the controller 150 is capable of carrying out constant-current control of the bias applied from the secondary transfer power source D2 to the secondary transfer roller 8 by controlling a voltage outputted from the secondary transfer power source D2 so that a current value detected by a current detecting circuit 18 (described later) is a predetermined current value. Further, in this embodiment, as specifically described later, the controller 150 determines a target voltage of the secondary transfer bias during non-image formation before image formation, and subjects the secondary transfer bias to the constant-voltage control during the secondary transfer so that the secondary transfer bias is kept substantially constant at the target voltage.

To the controller 150, the current detecting circuit 18 as a current detecting means (current detecting portion) is connected. The current detecting circuit 18 detects a current which is outputted from the secondary transfer power source D2 to the secondary transfer roller 8 and which flows through the secondary transfer portion T2. The current detecting circuit 18 outputs an analog voltage of 0-5 V depending on a current value, and this analog voltage is AD-converted to an 8-bit digital signal and is used for calculation by the controller 150.

Further, to the controller 150, the voltage detecting circuit 19 as a voltage detecting means (voltage detecting portion) is connected. The voltage detecting circuit 19 detects a voltage which is outputted from the secondary transfer power source D2 to the secondary transfer roller 8 and which flows through the secondary transfer portion T2. The voltage detecting circuit 19 outputs an analog voltage of 0-5 V depending on a voltage value, and this analog voltage is AD-converted to an 8-bit digital signal and is used for calculation by the controller 150.

Further, to the controller 150, an environmental sensor 17 as an environment detecting means for detecting environment (use environment of the image forming apparatus 100) which is at least one of a temperature and a humidity of at least one of an inside and an outside of the image forming apparatus 100 is connected. In this embodiment, the environmental sensor 17 detects the temperature and the humidity in a casing of the image forming apparatus 100. The information on the temperature and the humidity detected by the environmental sensor 17 is inputted to the controller 150.

Further, to the controller 150, an operating panel 120 as an operating portion is connected. The operating panel 120 is constituted by including a display portion as a display means for displaying information under control of the controller 150 and an input portion as an input means for inputting the information to the controller 150.

In this embodiment, the operating panel 120 includes a touch panel functioning as the display portion and the input portion. An operator such as a user or a service person operates the operating panel 120, and is capable of inputting setting on the image formation to the controller 150. For example, the operating panel 120 displays a selection screen of the recording material P and is capable of allowing the operator to select a kind of the recording material P used for image formation.

Further, to the controller 150, information on a print job is to be inputted from an external device. The information on the print job includes image data and information (control instruction) of setting on image formation, such as data for designating the kind of the recording material P used for the image formation, for example.

Incidentally, the print job is a series of operations started by a single start instruction and in which the image is formed and outputted on a single recording material P or a plurality of recording materials P. The print job includes an image forming step, a pre-rotation step, a sheet (paper) interval step in the case where the images are formed on the plurality of recording materials P, and a post-rotation step in general. The image forming step is a period in which formation of an electrostatic image for the image actually formed and outputted on the recording material P, formation of the toner image, and primary transfer, secondary transfer, and fixing of the toner image are carried out, and during image formation refers to this period. Specifically, timings during the image formation are different among positions where the respective steps of the charging, the exposure, the development, the primary transfer, the secondary transfer, and the fixing are performed. The pre-rotation step is performed in a period in which a preparatory operation, before the image forming step, from an input of the start instruction until the image is started to be actually formed. The sheet interval step (image interval step) is a period corresponding to an interval between a recording material P and a subsequent recording material P when the images are continuously formed on a plurality of recording materials P (continuous image formation). The post-rotation step is a period in which a post-operation (preparatory operation) after the image forming step is performed. During non-image formation (non-image formation period) is a period other than during image formation and includes the pre-rotation step, the sheet interval step, the post-rotation step and further includes a pre-multi-rotation step which is a preparatory operation during turning-on of a main switch (power source) of the image forming apparatus 100 or during restoration from a sleep state.

Further, the kind of the recording material P embraces arbitrary information capable of discriminating the recording material P, including values, ranges, and the like of attributes, manufacturers, brands, product numbers, basis weights, sizes and the like, based on general properties such as plain paper, thick paper, thin paper, glossy paper, coated paper, and the like.

The controller 150 discriminates the information of the print job from operation contents of the operator in the operating panel 120 or from the external device and thus is capable of discriminating the setting on the image formation such as the kind of the recording material P used for the image formation.

3. Secondary Transfer Bias Control

Next, secondary transfer bias control in this embodiment will be described.

<ATVC>

The electric resistance value of the secondary transfer portion T2 changes depending on an environment (temperature, humidity), a fluctuation in initial electric resistance value of members such as the secondary transfer roller 8 and the intermediary transfer belt 7 (principally, the secondary transfer roller 8), energization history, and the like. Particularly, it is known that the secondary transfer roller 8 of the ion-conductive type is liable to fluctuate in electric resistance value thereof depending on an ambient environment.

Here, secondary transfer efficiency (rate of movement of the toner carried on the intermediary transfer belt 7 toward the recording material P) shows a peak at a certain secondary transfer current value in general. Due to a fluctuation in electric resistance value of the secondary transfer roller 8, when the secondary transfer current value is deviated from the peak of the secondary transfer efficiency, the secondary transfer efficiency lowers, so that there is a possibility that improper transfer occurs.

Therefore, during non-image formation before the image formation (before the secondary transfer step), ATVC (Active Transfer Voltage Control) for determining a target voltage of the constant-voltage control of the secondary transfer bias depending on the electric resistance value of the secondary transfer portion T2 (principally, the secondary transfer roller 8) is executed. In the ATVC, the target voltage of the constant-voltage control of the secondary transfer bias is determined using, as a target current, a secondary transfer current value at which the secondary transfer efficiency roughly shows the peak. As during the non-image formation in which the ATVC is executed, it is possible to cite during the pre-multi-rotation step at the time of rising of the image forming apparatus 100, during the pre-rotation step before the start of the image formation of the print job, and the like. By executing the ATVC, a part (sharing) voltage Vb of the secondary transfer portion T2 during the non-image formation necessary to determine the target voltage of the secondary transfer bias applied to the secondary transfer roller 8 in the constant-voltage control during the secondary transfer (during sheet passing) can be determined. Then, a voltage Vt (=Vb+Vp) which is a voltage value obtained by adding the part voltage Vb of the secondary transfer portion T2 during the non-sheet passing and a recording material part voltage Vp set in advance is determined as a target voltage of the secondary transfer bias applied to the secondary transfer roller 8 in the constant-voltage control during the secondary transfer (during the sheet passing). In this embodiment, during the non-sheet passing in an initial stage of the secondary transfer step (immediately before the recording material P reaches the secondary transfer portion T2), the part voltage Vb of the secondary transfer portion T2 is applied to the secondary transfer roller 8 in the constant-voltage control.

Incidentally, during the non-sheet passing refers to a time when the recording material P is absent in the secondary transfer portion T2. During the non-sheet passing, the secondary transfer roller 8 contacts the intermediary transfer belt 7.

In the ATVC in this embodiment, the controller 150 carries out control so that test biases (test currents or test voltages) of a plurality of levels are applied to the secondary transfer roller 8 (secondary transfer portion T2) by the secondary transfer power source D2 during the non-sheet portion. Particularly, in this embodiment, the controller 150 carries out control so that test biases of 3 levels subjected to constant-current control by the secondary transfer power source D2 are applied to the secondary transfer roller 8. Further, the controller 150 calculates an average (value) of voltage values sampled at predetermined intervals by the voltage detecting circuit 19 during application of the test biases of the respective levels, subjected to the constant-current control, to the secondary transfer roller 8. By this, the controller 150 acquires a voltage-current characteristic as information on the electric resistance value of the secondary transfer portion T2 (principally, the secondary transfer roller 8). Further, on the basis of this voltage-current characteristic, the controller 150 determines the part voltage Vb of the secondary transfer portion T2 during the non-image formation. Then, the controller 150 causes the memory 152 to store the part voltage Vb of the secondary transfer portion T2 during the non-image formation.

Incidentally, in this embodiment, in the ATVC, the test bias subjected to the constant-current control is applied to the secondary transfer roller 8 (secondary transfer portion T2), and the voltage generated at that time was detected by the voltage detecting circuit 19, but the present invention is not limited thereto. In the ATVC, the test bias subjected to the constant-voltage control is applied to the secondary transfer roller 8 (secondary transfer portion T2), and the current flowing at that time may be detected by the current detecting circuit 18. In the ATVC, both the test bias subjected to the constant-current control and the test bias subjected to the constant-voltage control may be used. The voltage-current characteristic as the information on the electric resistance value of the secondary transfer portion T2 (principally, the secondary transfer roller 8) may only be required to be capable of being acquired.

<Test Bias and Application Time Thereof>

Next, a determining method of target currents for test biases of 3 levels in the ATVC in this embodiment will be described.

The target currents for the test biases of 3 levels are taken as a first target current Itarget 1, a second target current Itarget 2, and a third target current Itarget 3. These target currents Itarget 1, Itarget 2, and Itarget 3 satisfy a relationship of: Itarget 1<Itarget 2<Itarget 3.

Itarget 3 is set in advance depending on an environment (absolute humidity (water content) calculated on the basis of a temperature and a humidity) and a kind of the recording material P, and is stored as a data table or the like in the memory 152. The controller 150 calculates the absolute humidity on the basis of the temperature and the humidity detected by the environmental sensor 17. Further, the controller 150 discriminates the kind of the recording material P from the operation contents in the operating portion 120 or the print job inputted from the external device. Then, on the basis of the absolute humidity and the kind of the recording material P, the controller 150 determines Itarget 3 by making reference to the above-described data table. Here, as an example, Itarget 3 is taken as 60 μA.

Further, the controller 150 determines Itarget 2 by the following formula.

$$Itarget\,2 = Itarget\,3 \times 0.7.$$

Further, the controller 150 determines Itarget 1 as 1.0 μA which is a fixed value.

Next, application times of the test biases of 3 levels in the ATVC in this embodiment will be described.

The application times in which the test biases are applied to the secondary transfer roller 8 through the constant-current control using Itarget 1, Itarget 2, and Itarget 3 as the target currents are taken as a first application time Troll 1, a second application time Troll 2, and a third application time Troll 3, respectively. In this embodiment, in order to shorten a time required for the ATVC, the times Troll 1, Troll 2, and Troll 3 are set in advance as shown in a table 1 below. Incidentally, in this embodiment, a peripheral speed (surface movement speed) of the secondary transfer roller 8 during the ATVC is 320 mm/sec.

TABLE 1

| Troll 1 (msec) | Troll 2 (msec) | Troll 3 (msec) |
|---|---|---|
| 16 | 37 | 238 |

Troll 3 is a time corresponding to substantially one full circumference of the secondary transfer roller 8 in order to enable detection of a voltage value corresponding to one full circumference of the secondary transfer roller 8. Incidentally, in consideration of times required for rising and falling of an output voltage of the secondary transfer power source D2, the application time of the test bias of each of the levels is made somewhat longer than a detection time of the voltage value when the associated test bias is applied to the secondary transfer roller 8. The time corresponding to substantially one full circumference of the secondary transfer roller 8 includes, for example, a time increased or decreased from a time corresponding to one full circumference within a range of a margin or an error in consideration of the rising or the falling of the output voltage of the above-described secondary transfer power source D2, for example, a time within a range of about +5% of a time corresponding to one full circumference of the secondary transfer roller 8. Further, Troll 2 is shorter than Troll 3, and Troll 1 is shorter than Troll 2. Incidentally, from the viewpoint of shortening of the time required for the ATVC, Troll 1 and Troll 2 may preferably be less than 90%, more preferably be less than 70% of Troll 3. However, typically, Troll 1 and Troll 2 are 5% or more of Troll 3.

Figure 3:
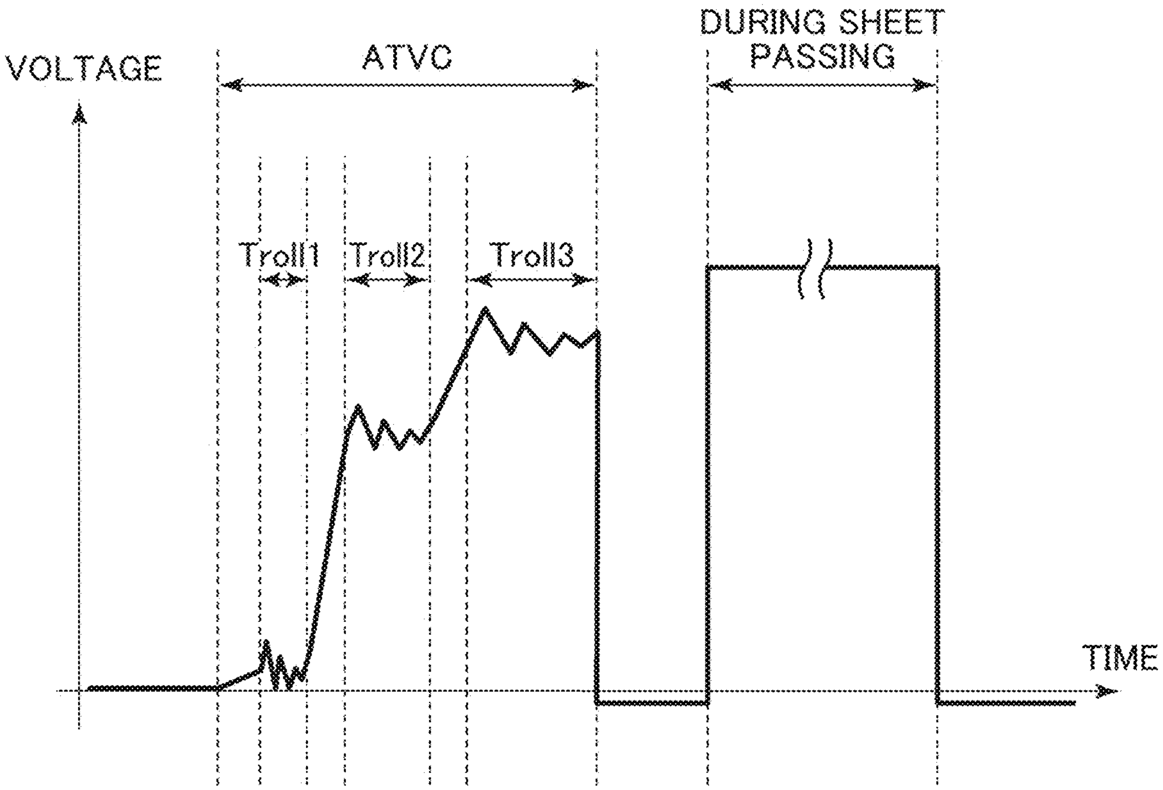
FIG. 3 is a graph showing progression of an applied voltage to a transfer portion in control of an embodiment 1.

FIG. 3 is a time chart schematically showing progression of an applied voltage to the secondary transfer roller 8 (secondary transfer portion T2) during the ATVC and during the secondary transfer in this embodiment.

The voltage values in the times Troll 1, Troll 2, and Troll 3 as described above are detected, respectively, and averages V1, V2, and V3 are calculated, respectively. Then, on the basis of Itarget 1, Itarget 2, Itarget 3, V1, V2, and V3, a voltage-current characteristic is acquired. Further, on the basis of this voltage-current characteristic, the part voltage Vb of the secondary transfer portion T2 during the non-sheet passing in which Itarget 1 corresponding to a target current during the secondary transfer (during the sheet passing) is acquired.

Further, from this part voltage Vb of the secondary transfer portion T2 during the non-sheet passing and the recording material part voltage Vp set in advance, the target voltage Vt of the constant-voltage control of the secondary transfer bias during the secondary transfer (during the sheet passing) is acquired.

<Control Procedure>

Figure 4:
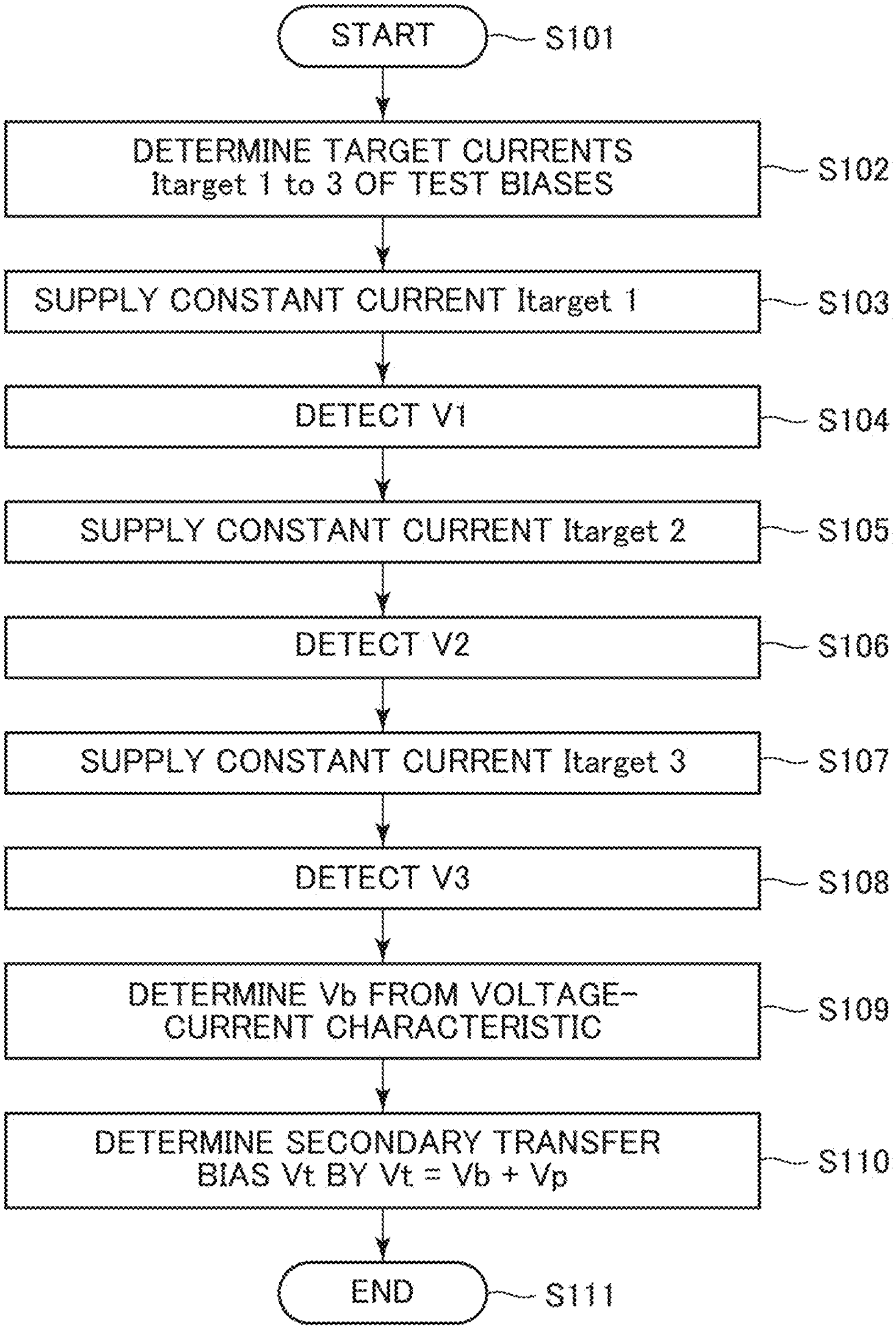
FIG. 4 is a flowchart for illustrating the control of the embodiment 1.

Procedure of the ATVC in this embodiment will be further described. FIG. 4 is a flow chart schematically showing the procedure of the ATVC in this embodiment.

When a start instruction of the print job is inputted, in a pre-rotation step before the toner image and the recording material P reach the secondary transfer portion T2, the controller 150 starts the ATVC (S101). Then, the controller 150 determines a first target current Itarget 1, a second target current Itarget 2, and a third target current Itarget 3 which are test biases of three levels in the ATVC (S102). This determining method of Itarget 1, Itarget 2, and Itarget 3 is as described above. Next, on the basis of a detection result of the current detecting circuit 18, the controller 150 carries out control so that the test bias is applied from the secondary transfer power source D2 to the secondary transfer roller 8 through the constant-current control with Itarget 1 as the target current (S103).

Further, on the basis of a detection result of the voltage detecting circuit 19 in the time Troll 1, the controller 150 acquires the average V1 of the voltage value and causes the memory (RAM) 152 to store the average V1 (S104). Then, on the basis of the detection result of the current detecting circuit 18, the controller 150 carries out control so that the test bias is applied from the secondary transfer power source D2 to the secondary transfer roller 8 through the constant-current control with Itarget 2 (>Itarget 1) as the target current (S105). Further, on the basis of the detection result of the voltage detecting circuit 19 in the time Troll 2, the controller 150 acquires the average V2 of the voltage value and causes the memory (RAM) 152 to store the average V2 (S106). Then, on the basis of the detection result of the current detecting circuit 18, the controller 150 carries out control so that the test bias is applied from the secondary transfer power source D2 to the secondary transfer roller 8 through the constant-current control with Itarget 3 (>Itarget 2) as the target current (S107). Further, on the basis of the detection result of the voltage detecting circuit 19 in the time Troll 3, the controller 150 acquires the average V3 of the voltage value and causes the memory (RAM) 152 to store the average V2 (S108).

Next, on the basis of Itarget 1, Itarget 2, Itarget 3, V1, V2, and V3, the controller 150 acquires the part voltage Vb of the secondary transfer portion T2 during the non-sheet passing corresponding to Itarget 1 corresponding to the target current during the secondary transfer (during the sheet passing) and causes the memory (RAM) 152 to store the part voltage Vb (S109). In this embodiment, the controller 150 approximates the voltage-current characteristic showing a relationship among Itarget 1, Itarget 2, Itarget 3, V1, V2, and V3. The controller 150 causes the memory 152 to store the acquired voltage-current characteristic. Further, on the basis of this voltage-current characteristic, the controller 150 acquires the part voltage Vb of the secondary transfer portion T2 corresponding to Itarget 1 (i.e., the target current during the secondary transfer). The controller 150 causes the memory (RAM) 152 to store the acquired part voltage Vb of the secondary transfer portion T2 during the non-sheet passing. Then, the controller 150 adds the recording material part voltage Vp to the acquired part voltage Vb of the secondary transfer portion T2, and determines the target voltage Vt of the secondary transfer bias applied to the secondary transfer roller 8 through the constant-voltage control during the secondary transfer (during the sheet passing) (S110). Information of the recording material part voltage Vp is set in advance depending on the kind of the recording material P, an environmental condition, and the like in advance, and are stored as a table data or the like in the memory (ROM) 152. The controller 150 causes the memory (RAM) 152 to store the determined target voltage Vt of the secondary transfer bias during the secondary transfer (during the sheet passing). During the secondary transfer, the secondary transfer bias subjected to the constant-voltage control with this target voltage Vt is applied to the secondary transfer roller 8. Thereafter, the controller 150 ends the ATVC (S111).

Incidentally, a method itself for acquiring the voltage-current characteristic from detection results of 3 levels in the ATVC is arbitrary, but for example, it is possible to use the method of least squares. Further, in this embodiment, in the ATVC, the target voltage of the secondary transfer bias was acquired on the basis of a quadratic function acquired from the detection result of 3 levels, but is not limited thereto. Depending on detection accuracy of a desired voltage-current characteristic of the secondary transfer roller 8, the target voltage of the secondary transfer bias may be acquired on the basis of a quadratic function acquired from detection results of 4 levels or more. However, by detection results of 10 levels or less, the voltage-current characteristic can be acquired with sufficient accuracy in many instances.

4. Effect of this Embodiment

A table 2 below shows a result in which a fluctuation in current actually flowing in the case where the target current during the secondary transfer is set to 70 μA and the target voltage of the constant-voltage control of the secondary transfer bias is determined was compared between the case where the ATVC in this embodiment (embodiment 1) was carried out and the case where the ATVC was carried out in a situation such that each of Troll 1, Troll 2, and Troll 3 was set to a time (238 msec) corresponding to substantially one full circumference of the secondary transfer roller 8.

TABLE 2

| | CT*2 (msec) | CF*3 |
|---|---|---|
| EMB. 1 | 291 | 70 ± 2 μA |
| OFC*1 | 714 | 70 ± 2 μA |

*1"OFC" is the substantially one full circumference of the secondary transfer roller 8 for all three points.
*2"CT" is a control time.
*3"CF" is a current fluctuation in the case where the target current was set to 70 μA.

From the table 2, it is understood that the current fluctuation in the case where the ATVC in this embodiment was carried out is equivalent to the current fluctuation in the case where the ATVC was carried out in the situation such that each of Troll 1, Troll 2, and Troll 3 was set to the time corresponding to substantially one full circumference of the secondary transfer roller 8. Thus, according to this embodiment, a good image can be formed by sufficiently maintaining accuracy of control of the secondary transfer bias while shortening a time required for the ATVC.

The reason why such a result is obtained will be described. The electroconductive rubber sponge layer of the secondary transfer roller 8 in this embodiment has unevenness ("circumferential unevenness") of the electric resistance value in the circumferential direction (rotational direction) of the secondary transfer roller 8. In this embodiment, this circumferential unevenness is 1.1 in the case where the circumferential unevenness is represented by a difference (=(common logarithm of maximum)−(common logarithm of minimum) between the common logarithm of the maximum of the electric resistance value and the common logarithm of the minimum of the electric resistance value with respect to the circumferential direction of the secondary transfer roller 8. Parts (a), (b), and (c) of FIG. 5 are graphs for illustrating fluctuations in V1, V2, and V3, respectively, acquired in the case where Troll 1, Troll 2, and Troll 3 are changed, respectively, in this case. Part (a) of FIG. 5 shows a relationship between Troll 1 and each of a maximum (Vmax) and a minimum (Vmin) of V1. Part (b) of FIG. 5 shows a relationship between Troll 2 and each of the maximum (Vmax) and the minimum (Vmin) of V2. Part (c) of FIG. 5 shows a relationship between Troll 3 and each of the maximum (Vmax) and the minimum (Vmin) of V3. In parts (a), (b), and (c) of FIG. 5, the abscissa represents a test bias application time (Troll 1, Troll 2, Troll 3, respectively), and the ordinate represents a voltage value (V1, V2, V3, respectively) acquired in the ATVC. From FIG. 5, it is understood that the fluctuation in voltage value when the application time is made short becomes larger with an increasing target current of the test bias, i.e., with an increasing voltage value (measured voltage value) of the test bias. In the case where this fluctuation is large, a fluctuation in acquired part voltage Vb of the secondary transfer portion T2 during the non-sheet passing becomes large, and a fluctuation of the secondary transfer current flowing during the secondary transfer relative to the target current becomes large. That is, in the case where the voltage value (measured voltage value) of the test bias is small, even when the application time is made short, the fluctuation in voltage value is small, and therefore, accuracy of the voltage-current acquired by using the voltage value can be sufficiently maintained.

Parts (a) and (b) of FIG. 6 are graphs showing voltage-current characteristics represented by quadratic functions, acquired in the case where the ATVC in this embodiment was carried out and the case where the ATVC was carried out in a situation such that each of Troll 1, Troll 2, and Troll 3 is set to a time (238 msec) corresponding to substantially one full circumference of the secondary transfer roller 8, respectively. Part (a) of FIG. 6 shows a voltage-current characteristic in the case where the ATVC in this embodiment was carried out, and part (b) of FIG. 6 shows a voltage-current characteristic in the case where the ATVC was carried out in the situation such that each of Troll 1, Troll 2, and Troll 3 is set to the time corresponding to the substantially one full circumference of the secondary transfer roller 8. From FIG. 6, it is understood that even in the case where the ATVC in this embodiment was carried out, with accuracy comparable to accuracy in the case where the ATVC was carried out in the situation such that each of Troll 1, Troll 2, and Troll 3 is set to the time corresponding to the substantially one full circumference of the secondary transfer roller 8, it is possible to determine a target voltage of the constant-voltage control of the secondary transfer bias by which a desired target current is obtained.

Therefore, in this embodiment, the application time is made longer with an increasing voltage value (measured voltage value) of the test bias. Preferably, the application time of the test bias of at least one level is made not less than the time corresponding to the substantially one full circumference of the secondary transfer roller 8. In the case where the application time is made longer than the time corresponding to the substantially one full circumference, the application time can be made a time corresponding to, for example, substantially an integer full circumference of the secondary transfer roller 8 from a viewpoint of improving detection accuracy while suppressing the influence of the circumferential unevenness. However, the application time of the test bias of at least one level is sufficient to be a time corresponding to not move than substantially five full circumferences of the secondary transfer roller 8, typically not more than substantially three full circumferences of the secondary transfer roller 8. In other words, in this embodiment, the application time is made shorter with a low voltage value (measured voltage value) of the test bias. By this, while shortening the time required for the ATVC, a fluctuation of the detection result of the voltage value can be made small, and a fluctuation of the secondary transfer current flowing during the secondary transfer relative to the target current can be made small.

Thus, in this embodiment, the image forming apparatus 100 includes the image bearing member (intermediary transfer belt) 7 for bearing the toner image, the transfer member (secondary transfer roller) 8 for forming the transfer portion (secondary transfer portion) T2 where the toner image is transferred from the image bearing member 7 onto the toner image receiving member (recording material) P, the applying portion (secondary transfer power source) D2 for applying the bias to the transfer portion T2, the detecting portion (the voltage detecting portion in this embodiment) 19 for detecting the voltage applied to the transfer portion T2 or the current flowing through the transfer portion T2 when the bias is applied to the transfer portion T2 by the applying portion D2, and the controller 150 capable of controlling the applying portion D2, wherein the controller 150 is capable of carrying out control so as to execute the adjusting operation (ATVC) in which when the transfer is not made in the transfer portion T2, a first test bias and a second test bias higher in absolute value of the voltage are applied to the transfer portion T2 by the applying portion D2, and then on the basis of a detection result of the detecting portion 19 when each of the first test bias and the second test bias is applied to the transfer portion T2, a transfer bias applied to the transfer portion T2 by the applying portion D2 during the transfer is set. Further, in this embodiment, in the above-described adjusting operation, the controller 150 carries out control so that a first time in which the first test bias is applied to the transfer portion T2 is made shorter than a second time in which the second test bias is applied to the transfer portion T2. Here, the first time may preferably be 5% or more and less than 90% of the second time. Further, the first time may more preferably be 5% or more and less than 70% of the second time.

In this embodiment, the transfer member 8 is the roller 8 for forming the transfer portion T2 in contact with the surface of the image bearing member 7, and the second time is a time corresponding to at least substantially one full circumference of the roller 8. Particularly, in this embodiment, the image bearing member 7 is constituted by an endless belt, and the transfer member 8 is the outer roller (secondary transfer roller) 8 for forming the transfer portion T2 in contact with the inner roller (secondary transfer opposite roller) 75, through the belt, contacting the inner peripheral surface of the belt. And, the second time is a time corresponding to at least the substantially one full circumference of the roller 8. Further, in this embodiment, the applying portion D2 applies the bias to the roller 8.

Further, in this embodiment, the image forming apparatus 100 includes the environment detecting means (environmental sensor) 17 for detecting at least one of the temperature and the humidity, and the controller 150 carries out control so as to change at least one of the first test bias and the second test bias on the basis of a detection result of the environment detecting means 17. Further, in this embodiment, the controller 150 carries out control so that the above-described adjusting operation is executed in the preparatory operation (pre-rotation step, pre-multi-rotation step) before the transfer in the print job for forming image(s) consisting of the toner image(s) on a single recording material P or a plurality of recording materials P is made. Further, in this embodiment, the controller 150 carries out control so that in the above-described adjusting operation, the first test bias and the second test bias subjected to the constant-current control are applied to the transfer portion T2 and then the above-described transfer bias is set on the basis of a detection result of the voltage by the detecting portion (voltage detecting circuit) 19 when each of the first test bias and the second test bias is applied to the transfer portion T2. However, the controller 150 may be configured to carry out control so that in the above-described adjusting operation, the first test bias and the second test bias subjected to the constant-voltage control are applied to the transfer portion T2 and then the above-described transfer bias is set on the basis of a detection result of the current by the detecting portion (current detecting circuit) 18 when each of the first test bias and the second test bias is applied to the transfer portion T2. Further, in this embodiment, the controller 150 carries out control so that in the above-described adjusting operation, a plurality of different test biases including the first test bias and the second test bias are applied to the transfer portion T2, and the second test bias is a test bias, of the plurality of different test biases, highest in absolute value of the voltage.

As described above, according to this embodiment, it becomes possible to shorten the control time while sufficiently maintaining the accuracy of the control of the secondary transfer bias.

Embodiment 2

Next, another embodiment of the present invention will be described. Basic constitutions and operations of an image forming apparatus in this embodiment are the same as those of the image forming apparatus of the embodiment 1. Accordingly, in the image forming apparatus of this embodiment, elements having the same or corresponding functions or constitutions as those in the embodiment 1 are represented by the same reference numerals or symbols as those in the embodiment 1 and will be omitted from detailed description.

In the embodiment 1, in the ATVC, the voltage-current characteristic was acquired by applying the test biases of the 3 levels to the secondary transfer roller 8 by the secondary transfer power source D2. In this embodiment, in the ATVC, a voltage-current characteristic is acquired by applying test biases of 2 levels to the secondary transfer roller 8 by the secondary transfer power source D2.

In the ATVC in this embodiment, similarly as in the embodiment 1, the controller 150 carries out control so that test biases (test currents or test voltages) of a plurality of levels are applied to the secondary transfer roller 8 (secondary transfer portion T2) by the secondary transfer power source D2 during the non-sheet portion. Particularly, in this embodiment, the controller 150 carries out control so that test biases of 2 levels subjected to constant-current control by the secondary transfer power source D2 are applied to the secondary transfer roller 8. Further, the controller 150 calculates an average (value) of voltage values sampled at predetermined intervals by the voltage detecting circuit 19 during application of the test biases of the respective levels, subjected to the constant-current control, to the secondary transfer roller 8. By this, the controller 150 acquires a voltage-current characteristic as information on the electric resistance value of the secondary transfer portion T2 (principally, the secondary transfer roller 8). Further, on the basis of this voltage-current characteristic, the controller 150 determines the part voltage Vb of the secondary transfer portion T2 during the non-image formation. Then, the controller 150 causes the memory 152 to store the part voltage Vb of the secondary transfer portion T2 during the non-image formation.

Incidentally, in this embodiment, in the ATVC, the test bias subjected to the constant-current control is applied to the secondary transfer roller 8 (secondary transfer portion T2), and the voltage generated at that time was detected by the voltage detecting circuit 19, but the present invention is not limited thereto. In the ATVC, the test bias subjected to the constant-voltage control is applied to the secondary transfer roller 8 (secondary transfer portion T2), and the current flowing at that time may be detected by the current detecting circuit 18. In the ATVC, both the test bias subjected to the constant-current control and the test bias subjected to the constant-voltage control may be used.

In this embodiment, the target currents for the test biases of 2 levels are taken as a first target current Itarget 1 and a second target current Itarget 2. These target currents Itarget 1 and Itarget 2 satisfy a relationship of: Itarget 1<Itarget 2.

Itarget 2 is set in advance depending on an environment (absolute humidity (water content) calculated on the basis of a temperature and a humidity) and a kind of the recording material P, and is stored as a data table or the like in the memory 152. The controller 150 calculates the absolute humidity on the basis of the temperature and the humidity detected by the environmental sensor 17. Further, the controller 150 discriminates the kind of the recording material P from the operation contents in the operating portion 120 or the print job inputted from the external device. Then, on the basis of the absolute humidity and the kind of the recording material P, the controller 150 determines Itarget 2 by making reference to the above-described data table. Here, as an example, Itarget 2 is taken as 60 μA.

Further, the controller 150 determines Itarget 1 as 1.0 μA which is a fixed value.

The application times in which the test biases are applied to the secondary transfer roller 8 through the constant-current control using Itarget 1 and Itarget 2 as the target currents are taken as a first application time Troll 1 and a second application time Troll 2, respectively. In this embodiment, in order to shorten a time required for the ATVC, the times Troll 1 and Troll 2 are set in advance as shown in a table 3 below. Incidentally, similarly as the embodiment 1, in this embodiment, a peripheral speed (surface movement speed) of the secondary transfer roller 8 during the ATVC is 320 mm/sec.

TABLE 3

| Troll 1 (msec) | Troll 2 (msec) |
|---|---|
| 16 | 238 |

Troll 2 is a time corresponding to substantially one full circumference of the secondary transfer roller 8 in order to enable detection of a voltage value corresponding to one full circumference of the secondary transfer roller 8. Incidentally, similarly as the embodiment 1, in consideration of times required for rising and falling of a voltage output of the secondary transfer power source D2, the application time of the test bias of each of the levels is made somewhat longer than a detection time of the voltage value when the associated test bias is applied to the secondary transfer roller 8.

Further, Troll 1 is shorter than Troll 2. Incidentally, from the viewpoint of shortening of the time required for the ATVC, Troll 1 may preferably be less than 90%, more preferably be less than 70% of Troll 2. However, typically, Troll 1 is 5% or more of Troll 2.

FIG. 7 is a time chart schematically showing progression of an applied voltage to the secondary transfer roller 8 (secondary transfer portion T2) during the ATVC and during the secondary transfer in this embodiment.

The procedure of the ATVC in this embodiment is the same as that in the embodiment 1 except that the test biases are at the 2 levels.

A table 4 below shows a result in which a fluctuation in current actually flowing in the case where the target current during the secondary transfer is set to 70 HA and the target voltage of the constant-voltage control of the secondary transfer bias is determined was compared between the case where the ATVC in this embodiment (embodiment 2) was carried out and the case where the ATVC was carried out in a situation such that each of Troll 1 and Troll 2 was set to a time (238 msec) corresponding to substantially one full circumference of the secondary transfer roller 8.

TABLE 4

| | CT*[2] (msec) | CF*[3] |
|---|---|---|
| EMB. 2 | 254 | 70 ± 2 μA |
| OFC*[1] | 476 | 70 ± 2 μA |

*[1]"OFC" is the substantially one full circumference of the secondary transfer roller 8 for both points.
*[2]"CT" is a control time.
*[3]"CF" is a current fluctuation in the case where the target current was set to 70 μA.

From the table 4, it is understood that the current fluctuation in the case where the ATVC in this embodiment was carried out is equivalent to the current fluctuation in the case where the ATVC was carried out in the situation such that each of Troll 1 and Troll 2 was set to the time corresponding to substantially one full circumference of the secondary transfer roller 8. Thus, according to this embodiment, a good image can be formed by sufficiently maintaining accuracy of control of the secondary transfer bias while shortening a time required for the ATVC.

The reason why such a result occurs is as described in the embodiment 1.

That is, in this embodiment, similarly as in the embodiment 1, the circumferential unevenness of the secondary transfer roller 8 is 1.1 in the case where the circumferential unevenness is represented by a difference (=(common logarithm of maximum)−(common logarithm of minimum) between the common logarithm of the maximum of the electric resistance value and the common logarithm of the minimum of the electric resistance value with respect to the circumferential direction of the secondary transfer roller 8. Parts (a) and (b) of FIG. 8 are graphs, similar to FIG. 5, for illustrating fluctuations in V1 and V2, respectively, acquired in the case where Troll 1 and Troll 2 are changed, respectively, in this case. Part (a) of FIG. 8 shows a relationship between Troll 1 and each of a maximum (Vmax) and a minimum (Vmin) of V1. Part (b) of FIG. 8 shows a relationship between Troll 2 and each of the maximum (Vmax) and the minimum (Vmin) of V2. From FIG. 8, it is understood that the fluctuation in voltage value when the application time is made short becomes larger with an increasing target current of the test bias, i.e., with an increasing voltage value (measured voltage value) of the test bias. In the case where this fluctuation is large, a fluctuation in acquired part voltage Vb of the secondary transfer portion T2 during the non-sheet passing becomes large, and a fluctuation of the secondary transfer current flowing during the secondary transfer relative to the target current becomes large.

Further, parts (a) and (b) of FIG. 9 are graphs showing voltage-current characteristics represented by linear functions, acquired in the case where the ATVC in this embodiment carried out and the case where the ATVC was carried out in a situation such that each of Troll 1 and Troll 2 is set to a time (238 msec) corresponding to substantially one full circumference of the secondary transfer roller 8, respectively. Part (a) of FIG. 9 shows a voltage-current characteristic in the case where the ATVC in this embodiment was carried out, and part (b) of FIG. 9 shows a voltage-current characteristic in the case where the ATVC was carried out in the situation such that each of Troll 1 and Troll 2 is set to the time corresponding to the substantially one full circumference of the secondary transfer roller 8. From FIG. 9, it is understood that even in the case where the ATVC in this embodiment was carried out, with accuracy comparable to accuracy in the case where the ATVC was carried out in the situation such that each of Troll 1 and Troll 2 is set to the time corresponding to the substantially one full circumference of the secondary transfer roller 8, it is possible to determine a target voltage of the constant-voltage control of the secondary transfer bias by which a desired target current is obtained.

Thus, according to this embodiment, a fluctuation of the detection result of the voltage value can be made small, and a fluctuation of the secondary transfer current flowing during the secondary transfer relative to the target current can be made small.

As described above, according to this embodiment, an effect similar to the embodiment 1 can be obtained, and in addition, it is possible to realize simplification of the ATVC.

Embodiment 3

Next, another embodiment of the present invention will be described. Basic constitutions and operations of an image forming apparatus in this embodiment are the same as those of the image forming apparatus of the embodiment 1. Accordingly, in the image forming apparatus of this embodiment, elements having the same or corresponding functions or constitutions as those in the embodiment 1 are represented by the same reference numerals or symbols as those in the embodiment 1 and will be omitted from detailed description.

In the above-described embodiments, the ATVC was described in the pre-rotation step or in the pre-multi-rotation step, but in this embodiment, the ATVC executed in the sheet interval will be described. In this embodiment, the ATVC executed in the pre-rotation step or in the pre-multi-rotation step described in the above-described embodiments is referred to as "normal ATVC", and the ATVC executed in the sheet interval is referred to as "sheet interval ATVC".

During the continuous image formation, by heat generated by the fixing device 9, a temperature inside the casing of the image forming apparatus 100 increases. Further, frictional heat generates in some instances due to sliding between the rotation shaft and the bearing portion of the secondary transfer roller 8. For that reason, during the continuous image formation, the temperature of the secondary transfer roller 8 increases with a lapse of time, and the electric resistance value of the secondary transfer roller 8 fluctuates or the like, so that the voltage-current characteristic of the secondary transfer portion T2 changes in some instances. For that reason, during the continuous image formation, in the case where a set value of the secondary transfer bias is made constant, by the change in the electric resistance value of the secondary transfer roller 8 or the like, the secondary transfer current is deviated from the target current in some instances.

Therefore, in this embodiment, during the continuous image formation, at a predetermined timing, the sheet interval ATVC is executed in the sheet interval step, and the set value of the secondary transfer bias is corrected (set again). A timing when the sheet interval ATVC is executed can be, for example, the case where the number of sheets subjected to image formation during the continuous image formation reaches a predetermined number of sheets, and in addition, the case where an arbitrary index such as a lapse of the time or an environmental fluctuation satisfies a predetermined condition.

Here, in the sheet interval ATVC, a time of the sheet interval step is short, so that an application time (detection time of the voltage or the current) of the test bias of one level cannot be ensured in some insurances. In this embodiment, in this case, an average of detection results in a plurality of sheet interval steps is used as the detection result by the test bias.

Further, in this embodiment, also in the sheet interval ATVC, similarly as in the normal ATVC, the application time is made longer with a higher voltage value (measured voltage value) of the test bias. In other words, the application time is made shorter with a lower voltage value (measured voltage value) of the test bias. Further, in this embodiment, the application time of the test bias of at least one level is longer than a time of a single sheet interval step. For this reason, in this embodiment, in the sheet interval ATVC, the number of sheet interval steps in which the test bias is applied becomes larger with a higher voltage value (measured voltage value) of the test bias. In other words, the number of sheet interval steps in which the test bias is applied becomes smaller with a lower voltage value (measured voltage value) of the test bias. By this, an entire detection time in the sheet interval ATVC can be shortened. As a result, the fluctuation in voltage-current sheet of the secondary transfer portion T2 during the continuous image formation can be more quickly corrected while maintaining accuracy of the control of the secondary transfer bias.

FIG. 10 is a timing chart schematically showing a part of progression of the applied voltage to the secondary transfer roller 8 (secondary transfer portion T2) during the continuous image formation in this embodiment. The test biases of the third levels subjected to the constant-current control at the target currents Itarget 1, Itarget 2, and Itarget 3 which are the same as those in the normal ATVC described in the embodiment 1 are applied to the secondary transfer roller 8. Application times of the test biases of the respective levels are Troll 1, Troll 2, and Troll 3 which are the same as those in the normal ATVC described in the embodiment 1 (see the table 1). Further, a time (time required for passing of a single sheet interval through the secondary transfer portion T2) of the sheet interval step is set to 20 msec.

When an execution timing of the sheet interval ATVC arrives during the continuous image formation, similarly as in the normal ATVC, a target current of the test bias used in the sheet interval ATVC is determined.

Further, in the case where the detection result of the test bias of one level can be acquired in the single sheet interval step, the detection result acquired in the single sheet interval step is stored as the detection result of the test bias in the memory 152. In an example shown in FIG. 10, the detection result of the test bias with Itarget 1 as the target current is acquired in the single sheet interval step. On the other hand, in the case where the detection result of the test bias of one level cannot be acquired in the single sheet interval, the average of detection results acquired in the plurality of sheet interval steps is stored as the detection result of the test bias in the memory 152. In the example shown in FIG. 10, the detection result of the test bias with Itarget 2 as the target current is acquired as an average of detection results in two sheet interval steps. Further, the detection result of the test bias with Itarget 3 as the target current is acquired as an average of detection results in 12 sheet interval steps.

Thus, in this embodiment, the controller 150 executes application of a first test bias and a second test bias higher in absolute value of the voltage than the first intermediary transfer belt to the transfer portion T2 in the adjusting operation (ATVC) when a region corresponding to an interval between a recording material P and a subsequent recording material P on the intermediary transfer belt in a print job for forming images consisting of toner images on the plurality of recording materials P passes through the transfer portion T2 (sheet interval step), and in addition, carries out control so that the number of the above-described regions in which the first test bias is applied to the transfer portion T2 is made smaller than the number of the above-described regions in which the second test bias is applied to the transfer portion T2 in the case where at least one of a first time in which the first test bias is applied and a second time in which the second test bias is applied is longer than a time in which the above-described region passes through the transfer portion T2.

As described above, according to this embodiment, in the sheet interval ATVC, while sufficiently maintaining accuracy of the control of the secondary transfer bias, the control (correction, re-setting) of the secondary transfer bias during the continuous image formation can be performed more quickly by shortening the control time.

Other Embodiments

In the above, the present invention was described in accordance with specific embodiments, but is not limited to the above-described embodiments.

In the above-described embodiments, the secondary transfer bias of the opposite polarity to the normal charge polarity of the toner to the secondary transfer roller 8 contacting the outer peripheral surface of the intermediary transfer belt 7, and the secondary transfer opposite roller 75 contacting the inner peripheral surface of the intermediary transfer belt 7 is electrically grounded, but the present invention is not limited to such a constitution. As shown in part (a) of FIG. 11, a constitution in which a secondary transfer bias of the same polarity as the normal charge polarity of the toner is applied by the secondary transfer power source D2 to an inner roller 80 corresponding to the secondary transfer opposite roller 75 in the above-described embodiments and in which an outer roller 81 corresponding to the secondary transfer roller 8 in the above-described embodiments is electrically grounded may be employed. That is, the applying portion D2 may be configured to apply the bias to the transfer portion T2 by applying the bias to the inner roller 80. Also, in this constitution, in many instances, an electric resistance value of the outer roller 81 constituted by including an elastic layer relatively thick so as to form the secondary transfer portion (secondary transfer nip) T2 is predominant in the electric resistance value of the secondary transfer portion T2. Thus, in the case where the electric resistance value of the outer roller 81 is higher than the electric resistance value of the inner roller 80, the application time of the test bias of at least one level of the plurality of test biases may preferably be longer than a time corresponding to substantially one full circumference of the outer roller 81. That is, in the case where the image bearing member is constituted by the endless belt and the transfer member is the outer roller forming the transfer portion T2 in contact with the inner roller, through the belt, contacting the inner peripheral surface of the belt, the second time in which the second test bias, of the first and second test biases, higher in absolute value of the voltage may preferably be a time corresponding to substantially one full circumference of at least a roller, of the inner roller and the outer roller, higher in electric resistance value.

Further, in the above-described embodiments, the outer member contacting the outer peripheral surface of the intermediary transfer belt 7 was the secondary transfer roller 8 directly contacting the outer peripheral surface of the intermediary transfer belt 7, but the present invention is not limited to such a constitution. For example, as shown in part (b) of FIG. 11, the image forming apparatus may have a constitution in which a transfer belt (recording material conveyance belt) 84 stretched by a plurality of rollers forms the secondary transfer portion T2 in contact with the other peripheral surface of the intermediary transfer belt 7. In this constitution, an outer roller 83 is provided in a position opposing the inner roller 80 and the secondary transfer portion T2 where the intermediary transfer belt 7 and the transfer belt 84 contact each other by pressing the outer roller 83 toward the inner roller 80. Also, in this constitution, a constitution in which the secondary transfer bias of the opposite polarity to the normal charge polarity is applied to the outer roller 83 by the secondary transfer power source D2 and in which the inner roller 80 is electrically grounded can be employed.

Or, a constitution in which a secondary transfer bias of the same polarity as the normal charge polarity of the toner is applied by the secondary transfer power source D2 to the inner roller 80 corresponding to the secondary transfer opposite roller 75 in the above-described embodiments and in which the outer roller 83 is electrically grounded may be employed. Also, in this constitution, in many instances, an electric resistance value of the outer roller 83 is predominant in the electric resistance value of the secondary transfer portion T2. Thus, in the case where the electric resistance value of the outer roller 83 is higher than the electric resistance value of the inner roller 80, the application time of the test bias of at least one level of the plurality of test biases may preferably be longer than a time corresponding to substantially one full circumference of the outer roller 83. That is, the transfer member may be the roller (outer roller) 83 forming the transfer portion T2 in contact with the image bearing member (intermediary transfer belt) 7, through the endless belt (test bias belt) 84, contacting the surface of the image bearing member, and in this case, the second time in which the second test bias, of the first and second test biases, higher in absolute value of the voltage may preferably be a time corresponding to substantially one full circumference of at least the above-described roller 83.

Further, in the above-described embodiments, the present invention was applied to the secondary transfer portion, but the present invention is not limited thereto. The present invention is also applicable to, for example, a monochromatic image forming apparatus including only a single image bearing member. In this case, the present invention is applicable to a transfer portion where a toner image is transferred from the image bearing member onto a recording material. Incidentally, this image bearing member may be a drum-shaped or belt-shaped photosensitive member or an electrostatic recording dielectric member.

Further, in the above-described embodiments, the transfer voltage was described as the voltage subjected to the constant-voltage control during the transfer, but the present invention can be applied even in the case where the transfer voltage is subjected to the constant-current control during the transfer. In this case, in the ATVC, on the basis of the acquired voltage-current characteristic, it is possible to acquire an initial value of the target voltage necessary to obtain the target current during the transfer or to acquire the target current necessary to obtain the target voltage during the transfer, or the like.

Further, the ATVC executed in the pre-rotation step or in the pre-multi-rotation step which were explained in the above-described embodiments is not limited to the ATVC executed in the pre-rotation step every time. The ATVC can be executed at a predetermined timing (a timing based on a lapse of time, an environment fluctuation, exchange of component part, or the like).

According to the present invention, it becomes possible to shorten the control time while sufficiently maintaining the accuracy of the control of the transfer bias.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-138478 filed on Aug. 28, 2023, which is hereby incorporated by reference herein in its entirety.

What is claimed is:

1. An image forming apparatus comprising:

an image bearing member configured to bear a toner image;

a transfer member configured to form a transfer portion where the toner image is transferred from the image bearing member onto a toner image receiving member;

an applying portion configured to apply a bias to the transfer portion;

a detecting portion configured to detect a voltage applied to the transfer portion or a current flowing through the transfer portion when the bias is applied to the transfer portion by the applying portion; and a controller capable of controlling the applying portion so as to execute an adjusting operation in which a transfer bias applied to the transfer portion by the applying portion during transfer is set on the basis of a detection result of the detecting portion when a plurality of test biases including a first test bias and a second test bias are applied to the transfer portion by the applying portion during non-image formation, wherein in a case where the adjusting operation is executed from reception of a start signal of image formation to a start of transfer of an image on a first sheet in the transfer portion, the controller is configured to control the applying portion so that the second test bias is higher in absolute value of a voltage than that of the first test bias and is configured to control the applying portion so that a time in which the first test bias is applied to the transfer portion is set to a first time and so that a time in which the second test bias is applied to the transfer portion is set to a second time longer than the first time.

2. An image forming apparatus according to claim 1, wherein the first time is 5% or more and less than 90% of the second time.

3. An image forming apparatus according to claim 1, wherein the transfer member is a roller for forming the transfer portion in contact with a surface of the image bearing member, and the second time is a time corresponding to substantially one full circumference of at least the roller.

4. An image forming apparatus according to claim 1, wherein the image bearing member is constituted by an endless belt, wherein the transfer member is an outer roller for forming the transfer portion in contact with an inner roller, contacting an inner peripheral surface of the belt, through the belt, and wherein the second time is a time corresponding to substantially one full circumference of at least the outer roller.

5. An image forming apparatus according to claim 4, wherein the applying portion applies the bias to the transfer portion by applying the bias to the outer roller.

6. An image forming apparatus according to claim 4, wherein the applying portion applies the bias to the transfer portion by applying the bias to the inner roller.

7. An image forming apparatus according to claim 1, wherein the transfer member is a roller for forming the transfer portion in contact with the image bearing member through an endless belt contacting a surface of the image bearing member, and the second time is a time corresponding to substantially one full circumference of at least the roller.

8. An image forming apparatus according to claim 1, wherein the image bearing member is constituted by an endless belt, wherein the transfer member is an outer roller for forming the transfer portion in contact with an inner roller, contacting an inner peripheral surface of the belt, through the belt, and wherein the second time is a time corresponding to substantially one full circumference of at least a roller, of the inner roller and the outer roller, higher in electric resistance value.

9. An image forming apparatus according to claim 1, wherein the second test bias is a test bias, of the plurality of test biases, highest in absolute value of the voltage.

10. An image forming apparatus according to claim 1, wherein the first test bias is a test bias, of the plurality of test biases, lowest in absolute value of the voltage.

11. An image forming apparatus according to claim 1, wherein the plurality of test biases includes a third test bias higher in absolute value of the voltage than that of the first test bias and lower in absolute value of the voltage than that of the second test bias, wherein a time in which the third test bias is applied to the transfer portion is set to a third time, and wherein the third time is set longer than the first time and shorter than the second time.

* * * * *